US006731293B2

(12) United States Patent
Tojima et al.

(10) Patent No.: US 6,731,293 B2
(45) Date of Patent: May 4, 2004

(54) IMAGE OUTPUT DEVICE AND IMAGE OUTPUT CONTROL METHOD

(75) Inventors: Masayoshi Tojima, Kasuya-gun (JP); Toshihiro Moriiwa, Fukuoka (JP); Masatoshi Matsuo, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 511 days.

(21) Appl. No.: 09/867,708

(22) Filed: May 31, 2001

(65) Prior Publication Data

US 2002/0018054 A1 Feb. 14, 2002

(30) Foreign Application Priority Data

May 31, 2000 (JP) ....................................... 2000-163231

(51) Int. Cl.[7] ................................................ G06F 13/00
(52) U.S. Cl. ........................ 345/537; 345/560; 345/556
(58) Field of Search ................................ 345/536–537, 345/531, 556, 559, 660, 560, 545, 530, 473, 204, 213, 214; 710/260, 266; 348/222.1

(56) References Cited

U.S. PATENT DOCUMENTS 4,849,745 A * 7/1989 Satou ......................... 345/536
5,379,051 A * 1/1995 Suga et al. ................... 345/97
5,446,496 A 8/1995 Foster et al.
5,446,840 A 8/1995 Kiuchi et al.
5,627,569 A * 5/1997 Matsuzaki et al. .......... 345/214
5,701,135 A * 12/1997 Aratani et al. ................ 345/89
6,020,920 A * 2/2000 Anderson ................ 348/222.1

FOREIGN PATENT DOCUMENTS

JP 7-77958 3/1995
JP 9-93578 4/1997

* cited by examiner

*Primary Examiner*—Kee M. Tung
(74) *Attorney, Agent, or Firm*—Parkhurst & Wendel, L.L.P.

(57) ABSTRACT

The present invention provides an image output device which can periodically update display of image data as well as update the display images immediately and with minimum data transfer. A data transfer request control circuit 107 including a frame rate register 108 for deciding a data transfer request issue cycle and a data transfer request issuing unit 109 is provided in a video processing unit 104 of the image output device. When an update flag is set in the frame rate register 108, the data transfer request is issued in the next transfer section, regardless of the periodic transfer cycle, and the image data stored in the frame memory 106 are update.

25 Claims, 18 Drawing Sheets

IMAGE OUTPUT DEVICE AND IMAGE OUTPUT CONTROL METHOD

FIELD OF THE INVENTION

The present invention relates to an image output device and an image output control method.

BACKGROUND OF THE INVENTION

In recent years, portable terminals which uses a liquid crystal display (LCD) have increased in number, and the importance of image display is rising, while the reduction in power consumption has presented a significant challenge. Normally, the liquid crystal display requires a high display refresh rate, and needs 60-Hz updating. However, the image generation is carried out at 30 Hz or lower, so the difference in the rates is absorbed by providing a frame buffer or the like.

Japanese Published Patent Application No. Hei.07-77958 discloses such an electronic plotting device having a frame buffer, which will be described with reference to FIG. 15.

FIG. 15 is a block diagram illustrating a structure of the electronic plotting device 1.

In FIG. 15, a data supply unit 10 comprises an intermediate data generation unit 11 for generating intermediate data from graphic element data, and a pictographic data generation unit 12 for generating pictographic data from the intermediate data which are generated by the intermediate data generation unit 11. The data supply unit 10 converts the graphic element data into the pictographic data which are dot data rows in order of the scanning by a visualization device, and supplies the pictographic data to an output selection unit 30 and a cluster control unit 60. Frame memories 20 and 21 each stores second internal pictographic data which are one frame of the pictographic data supplied by the output selection unit 30. In accordance with input of a R/W control signal from a control unit 50, the frame memories 20 and 21 set one of two modes, i.e., a writing mode of writing one frame of the pictographic data and a reading mode of reading the stored one frame of the pictographic data. The output selection unit 30 selects one of first internal pictographic data which are supplied by the data supply unit 10, third internal pictographic data which are supplied by the frame memories 20 or 21, and fourth internal pictographic data which are supplied by the cluster control unit 60. A data display unit 40 displays the output pictographic data which are supplied by the output selection unit 60. The control unit 50 controls the device in its entirety. The cluster control unit 60 controls plural frames of the pictographic data to confluent successively.

The operation of the so-constructed electronic plotting device 1 will be described.

When a unit timing signal for indicating a position on a time series of the output pictographic data which are supplied to the data display unit 40 is input to the control unit 50, the control unit 50 generates a local timing signal for the internal processing of the data supply unit 10 and the like. This signal is basically the unit timing signal or the one which is obtained by adjusting the phase of the unit timing signal, and a signal which controls the supply of graphic element data which are required to be controlled to be asynchronous to the local timing signal is further added.

In addition, the control unit 50 generates a plotting section specification signal for specifying one plotting section in one frame, and outputs the signal to the intermediate data generation unit 11. The intermediate data generation unit 11 refers to the input graphic element data, and outputs intersection coordinates of a pattern border and a plotting line within the specified plotting section to the pictographic data generation unit 12. The pictographic data generation unit 12 generates the first internal pictographic data.

The first internal pictographic data are input to the output selection unit 30 and the cluster control unit 60. The cluster control unit 60 polymerizes (composes) the supplied first internal pictographic data and the third internal pictographic data which are supplied by the frame memories 20 or 21, and output the fourth internal pictographic data to the output selection unit 30.

The output selection unit 30 selects one of the first internal pictographic data and the fourth internal pictographic data, and outputs selected data to the data display unit 40, or the frame memories 20 and 21, or the data display unit 40 as well as the frame memories 20 and 21. This selection process is carried out in accordance with the output control signal which is supplied by the control unit 50. The pictographic data which are supplied from the output selection unit 30 to the data display unit 40 are referred to as the output pictographic data, and the pictographic data which are supplied from the output selection unit 30 to the frame memories 20 and 21 are referred to as the second internal pictographic data. Two frame memories 20 and 21 are provided in the prior art, while the frame memories can be more than two.

When the output pictographic data are supplied to the data display unit 40, the data display unit 40 displays the data, and when the second pictographic data are supplied to the frame memories 20 and 21, the frame memories 20 and 21 output the third internal pictographic data to the output selection unit 30 and the cluster control unit 60.

In cases where the first internal pictographic data cannot be output to the data display unit 40 in real time, i.e., the frame rate is low, the first internal pictographic data from the data supply unit 10 are supplied to the frame memories 20 and 21, and the control unit 50 controls the output selection unit 30 so that the third internal pictographic data which are output from one of the frame memories 20 and 21 are supplied to the data display unit 40.

In the Institute of Electronics, Information and Communication Engineers (IECE) technological research report, Vol.100, No.42, "Integrated Circuit", an architecture which outputs data from a single DRAM is disclosed in "A Development of a DMA Controller Unit in a MPEG4 Codec LSI", and the power consumption of LSI is described in Proc of CICC '99, pp 69–72, May 1999, "A MPEG4 Programmable Codec DSP with an Embedded Pre/Post-processing Engine". According to these documents, when an image of a CIF (352×288) size is subjected to 15 Hz-codec, the data transfer quantity related to a video interface (VIF) accounts for 41% of the entirety, and the operation ratio of a DMA bus and the operation ratio of the VIF are high. This is described with reference to FIG. 16.

FIG. 16 is a block diagram illustrating a structure of the MPEG4 codec LSI. This LSI comprises a processor 161, a video I/O interface 164, a host interface 160, and a DMA controller 163. Image data which are stored in a SDRAM 162 are suited for NTSC format images, and output to an NTSC encoder (DAC) 166 through the VIF 164 by 60 fields per sec. At this time, the power consumed in the entire chip except for the SDRAM 162 is about 640 mW.

Japanese Published Patent Application No. Hei.09-93578 discloses an image transmitter and an image receiver, which can easily convert the resolution of an image to be coded or decoded. In this image transmitter, a frame rate setting register is shown, and in the image receiver, the techniques related to a writing control and a reading control for a frame memory are shown, which are described with reference to FIGS. 17 and 18.

In the image transmitter shown in FIG. 17, a video signal is digitized by an A/D converter 19, and a switch is switched for each frame to input the signal to an image frame memory 22 or 23. A reading/writing control means 21 decides a pixel sampling method on the basis of a signal processing time of a QCIF image which is obtained by dividing an image of CCIR601 level, so as to have a frame rate within the one which is specified by a target frame rate setting means 26. To be more specific, in order to reduce the resolution of the input image, the CCIR601 level image is down-sampled by the reading/writing control means into plural QCIF images having different sampling positions. Then, the reading address is given to the image frame memories 22 and 23. A QCIF coding means 25 encodes an image of QCIF level by the DCT transformation and the quantization, and transmits coded image together with the QCIF number, to the receiver via a communication network 28.

In the image receiver shown in FIG. 18, a video signal which has been decoded by a decoding means 31 is written in an image frame memory 34 or 35. A reading/writing control means 33 selects one of the image frame memories 34 and 35 into which the signal is to be written. This is for the purpose of preventing the reading and the writing from simultaneously accessing the same memory, and switches 32 and 36 are alternately switched to be in opposite phases. The QCIF decoding means 31 detects that the decoding of the last QCIF in one frame (QCIF 3 in a case where one frame is divided into four pieces, and QCIF 15 in a case where one frame is divided into 16 pieces) has been completed, and notifies that to the reading/writing control means 33. That is, the switching of the switches 32 and 36 is instructed. When the reading/writing control means 33 is notified by the QCIF decoding means 31 that the decoding process for all QCIFs composing one frame has been finished, the reading/writing control means starts the reading of the video signal from the image frame memory 34 or 35, and reconstructs a CCIR601 image.

However, in the aforementioned prior art electronic plotting device, when the image composition is performed, an image is temporarily stored in the frame memory, composed with frame data which are transferred next, and thereafter output to an image display device. Therefore it takes at least one frame of delay to display a composed image.

In addition, in cases where the frame rate of a generated image is lower than the display rate of a data display unit, even when the display image is to be updated immediately, there is no updating means and further two frame memories alternately output data, whereby one frame of delay always occurs.

Further, when images which are to be updated immediately are two composed images having different frame rates, the composed images cannot be reflected immediately.

Furthermore, two frame memories are always required, resulting in an increased circuit scale, as well as it is necessary to read the temporarily stored data again from the frame memory to compose the same, thereby increasing the number of times of the data transfer, which leads an increase in the consumed power.

On the other hand, in the IECE technological research report, Vol.100, No.42, "Integrated Circuit", "A Development of a DMA Controller Unit in a MPEG4 Codec LSI" and Proc of CICC '99, pp 69–72, May 1999, "A MPEG4 Programmable Codec DSP with an Embedded Pre/Post-processing Engine" describe that increases in the operation ratios of the DMD bus and the VIF lead to increases in the consumed powers of a logic and a memory. It is considered that this is because the access to the memory or the operation ratio of the logic is increased since it is required to output the NTSC images from a single memory by 60 fields per sec.

Japanese Published Patent Application No. Hei.09-93578 does not disclose a method in which a frame rate register exists in the transmitter while only a decode termination notification is included in the receiver, and frame data are displayed in a fixed cycle but the image display is sometimes carried out in asynchronization with the cycle, and a technique concerning the data transfer control for that purpose.

When a video processing unit for subjecting decoded images to various kinds of video processing such as scaling of images and noise elimination is to be provided, the video processing unit should be inserted between a selector and a D/A converter. Accordingly, the video processing unit works for each output frame, which leads to an increase in the power consumption.

Further, in cases where the video processing unit has no scheduling for data transfer, where data transfer requests are to be issued at one position, and where the display schedule is changed by the image display device, when the data transfer is requested at a timing which is decided by hardware, this cannot handle various devices flexibly.

Further, when two frame memories are provided and switched by the switch, four memories are required when plural images like moving images and graphics are to be processed, thereby increasing a circuit scale.

SUMMARY OF THE INVENTION

It is an object of the present invention to provide an image output device and an image output control method, which can update a display screen immediately by a minimum data transfer.

Other objects and advantages of the present invention will become apparent from the detailed description and specific embodiments described are provided only for illustration since various additions and modifications within the spirit and scope of the invention will be apparent to those of skill in the art from the detailed description.

An image output device according to a 1st aspect of the present invention comprises a data memory for containing image data, a video processing unit for carrying out an image processing for the image data to generate display image data, a data transfer control unit for controlling data transfer between the data memory and the video processing unit, an output data storage unit for temporarily containing the display image data and outputting the display image data to an image display unit at regular intervals, and a system control unit for controlling the entire device, and this image output device comprises a data transfer request control circuit for issuing a data transfer request to execute the data transfer in units of prescribed data, only when the system control unit provides an update instruction for updating the display image data which are stored in the output data storage unit. Therefore, the data transfer is carried out only when the update flag is set in the frame update register, and thus the minimum data updating is carried out, whereby needless transfer can be omitted, and consequently the power consumption can be reduced. Further, when the update flag is set, the data transfer can be started automatically and immediately, whereby no complicated control exerted by the system control unit like in the prior art is required, as well as the image data can be immediately updated without delay.

According to a 2nd aspect of the present invention, in the image output device of the 1st aspect, the data transfer request control circuit comprises a data transfer request issuing unit for periodically issuing the data transfer request and a frame rate register for deciding a cycle of issuing the data transfer request, and this data transfer request issuing unit starts the issue of the data transfer request immediately at an issue start judgement timing of the data transfer request when an update flag is set in the frame rate register by the system control unit, regardless of the issue cycle which has been set in the frame rate register. Therefore, irregular data transfer requests can be immediately issued with maintaining the cycle of issuing the periodic data transfer request.

According to a 3rd aspect of the present invention, in the image output device of the 2nd aspect, the frame rate register comprises a counter for counting the issue start judgement timing of the data transfer request, a most significant bit is a bit which indicates the update flag, and lower bits except for the most significant bit decide the issue cycle, and when the update flag is effective, the counter is reset, the update flag is reset to an invalid value at an issue start judgement timing of the next data transfer request, and the counter counts again the issue cycle which has been decided by the lower bits except for the most significant bit. Therefore, the setting of the frame rate register and the counter can be automatically performed, and the transfer cycle and the transfer can be easily set, thereby requiring no resetting.

According to a 4th aspect of the present invention, in the image output device of the 3rd aspect, the frame rate register decides a transfer cycle which indicates a frame in which the data transfer request is to be issued, in a cycle of outputting images to the image display device, and the data transfer request issuing unit comprises a moving image transfer register for deciding whether transfer of moving image data is effective or invalid and a graphics transfer register for deciding whether transfer of graphics data is effective or invalid, and when the system control unit sets the update flag in the frame rate register, issues the data transfer request corresponding to the respective register only when the moving image register or the graphics register is effective. Therefore, the display image can be immediately updated, whereby the delay before the data display from the user's operation can be reduced, thereby providing no unnatural video. Further, since no needless transfer of the moving image data is carried out, the power consumption in a case where the data transfer is not carried out can be reduced.

According to a 5th aspect of the present invention, in the image output device of the 4th aspect, the data transfer request issuing unit issues the data transfer request for each line at a timing of a horizontal synchronous signal among signals for use in image output to the image display device, in a frame where the data transfer is effective. Therefore, the timing when the issue of the data transfer request is started can be easily controlled without the need for a special timing generator, and the issued request for the data transfer can be controlled in a periodic transfer cycle, whereby the transfer request issue can be easily realized by hardware.

According to a 6th aspect of the present invention, in the image output device of the 5th aspect, when the update flag is set in the frame rate register, the data transfer request issuing unit judges that the update flag is effective at a timing of the next vertical synchronous signal among the signals for use in image output to the image display device, and issues the data transfer request for transferring said frame. Therefore, the issue of the data transfer request can be judged in frame units and the system can be easily and accurately controlled, whereby the disturbance in images and the like hardly occurs.

An image output device according to a 7th aspect of the present invention comprises a data memory for containing image data, a video processing unit for carrying out an image processing for the image data to generate display image data, a data transfer control unit for controlling data transfer between the data memory and the video processing unit, an output data storage unit for temporarily containing the display image data and outputting the display image data to an image display device at regular intervals, and a system control unit for controlling the entire device, and this image output device comprises a fixed cycle interruption generation unit for outputting an interrupt signal to the system control unit at regular intervals in accordance with signals for use in image output to the image display device, and the system control unit judges whether the data transfer is to be carried out in accordance with input of the interrupt signal, and in a case where the control unit judged that it is an interrupt timing when the transfer is to be carried out, issues a data transfer request for carrying out the data transfer to the data transfer control unit, and in a case where the control unit judged that it is not an interrupt timing when the transfer is to be carried out, does not issue the data transfer request. Therefore, the update pattern can be changed by the system control unit in any phase of the development, and especially the update can be performed even after the completion of the system, whereby the update can be freely programmed and the flexibility of the update pattern is increased.

According to an 8th aspect of the present invention, in the image output device of the 7th aspect, the system control unit issues a moving image transfer request for transferring moving image data which are stored in the data memory, and a graphics transfer request for transferring graphics data which are stored in the data memory, respectively. Therefore, the moving image data and the graphics data can be controlled to be transferred separately, thereby reducing the power consumption.

According to a 9th aspect of the present invention, in the image output device of the 1st aspect, the video processing unit comprises a scaling unit for scaling moving image data which are transferred from the data memory to generate display moving image data, and a graphics generation unit for subjecting graphics data which are transferred from the data memory to graphics generation to generate display graphics image data, and composes the display moving image data and the display graphics image data to be output. Therefore, the processings for the moving image data and the graphics data can be separately controlled.

According to a 10th aspect of the present invention, in the image output device of the 9th aspect, the output data storage unit comprises a line buffer for temporarily containing one line of output data from the video processing unit, and a frame memory for containing one frame of output data from the line buffer. Therefore, the control on the timing of writing the display image data into the frame memory can be facilitated, and the composition and display of images can be realized by one frame memory. Further, since the data are stored in the frame memory in frame units, no disturbance in images occurs and the image display can be realized by fewer circuits.

According to an 11th aspect of the present invention, in the image output device of the 9th aspect, the output data storage unit comprises a frame memory for containing one frame of output data from the video processing unit and successively outputting the stored data in units of one line, and a line buffer for containing output data from the frame memory. Therefore, when the display image data are output to the image display device, it is not required to exert a control by a RAS or CAS like the frame memory, whereby the control on the timing of outputting the display image data can be more easily executed than it is executed directly from the frame memory.

According to a 12th aspect of the present invention, in the image output device of the 1st or 7th aspect, the video processing unit comprises a scaling unit for scaling moving image data which are transferred from the data memory to generate display moving image data, and a graphics generation unit for subjecting graphics data which are transferred from the data memory to graphics generation to generate display graphics image data, and outputs the display moving image data and the display graphics image data to the output data storage unit, respectively. Therefore, the processings for the moving image data and the graphics data can be separately controlled, thereby reducing the power consumption.

According to a 13th aspect of the present invention, in the image output device of the 12th aspect, the output data storage unit comprises a moving image line buffer for temporarily containing one line of the display moving image data, a moving image frame memory for temporarily containing one frame of output data from the moving image line buffer, a graphics line buffer for temporarily containing one line of the display graphics image data, and a graphics frame memory for temporarily containing one frame of output data from the graphics line buffer, and composes the data stored in the moving image frame memory and the data stored in the graphics frame memory to be output to the image display device. Therefore, the display moving image data and the display graphics image data can be separately stored, and no disturbance such as disappearance of video occurs. Further, these data can be separately updated, and the transfer of both image data is not always required, whereby the needless data transfer can be dispensed with and the power consumption can be reduced.

According to a 14th aspect of the present invention, in the image output device of the 12th aspect, the output data storage unit comprises a moving image frame memory for temporarily containing one frame of the display moving image data and successively outputting the stored display moving image data in units of one line, a moving image line buffer for temporarily containing output data from the moving image frame memory, a graphics frame memory for temporarily containing one frame of the display graphics image data and successively outputting the stored display graphics image data in units of one line, and a graphics line buffer for temporarily containing output data from the graphics frame memory, and composes the data stored in the moving image line buffer and the data stored in the graphics line buffer or separately output the data to the image display device. Therefore, even when the moving image data and the graphics data have different video formats, the data can be output individually in synchronization with the display line. In addition, even in cases where the numbers of display lines do not always coincident each other, such as a case where the same graphics image data are repeatedly output, it is not required to always read the data from the frame memory for each display line, thereby reducing the power consumption significantly.

According to a 15th aspect of the present invention, in the image output device of the 12th aspect, the output data storage unit comprises a moving image frame memory for temporarily containing one frame of the display moving image data and successively outputting the stored display moving image data in units of one line, a graphics frame memory for temporarily containing one frame of the display graphics image data and successively outputting the stored display graphics image data in units of one line, and a line buffer for composing output data from the moving image frame memory and output data from the graphics frame memory and temporarily containing the composed data. Therefore, the display moving image data and the display graphics data can be separately updated, and consequently the needless data transfer can be dispensed with and the power consumption can be reduced.

According to a 16th aspect of the present invention, in the image output device of the 12th aspect, the output data storage unit comprises a moving image line buffer for temporarily containing one line of the display moving image data, a moving image frame memory for temporarily containing one frame of output data from the moving image line buffer and outputting the stored display moving image data in units of one line, a graphics line buffer for temporarily containing one line of the display graphics image data, a graphics frame memory for temporarily containing one frame of output data from the graphics line buffer and outputting the stored display graphics image data in units of one line, and a line buffer for composing output data from the moving image frame memory and output data from the graphics frame memory, temporarily containing the composed data as display image data, and outputting the display image data to the image display device. Therefore, the display moving image data and the display graphics data can be separately updated, and further the respective operations of the circuits can be reduced, whereby the needless data transfer is dispensed with and the power consumption can be reduced.

According to a 17th aspect of the present invention, in the image output device of the 12th aspect, the output data storage unit comprises a first moving image line buffer for temporarily containing one line of the display moving image data, a moving image frame memory for temporarily containing one frame of output data from the first moving image line buffer and successively outputting the stored display moving image data in units of one line, a second moving image line buffer for temporarily containing output data from the moving image frame memory, a first graphics line buffer for temporarily containing one line of the display graphics image data, a graphics frame memory for temporarily containing one frame of output data from the first graphics line buffer and successively outputting the stored display graphics image data in units of one line, and a second graphics line buffer for temporarily containing output data from the graphics frame memory, and composes the data stored in the second moving image line buffer and the data stored in the second graphics line buffer to be output to the image display device. Therefore, the operation of the large capacity frame memory which stores one frame of image data for image display in a case where the image update is not carried out can be minimized, to reduce the power consumption significantly, as well as the data update of the display moving image data and the display graphics image data can be separately carried out, and further even when the moving image data and the graphics data have different video formats, the data can be output to the image display device individually in synchronization with the display line.

According to a 18th aspect of the present invention, the image output device of the 1st or 7th aspect comprises an operation clock stop control unit for controlling operation clocks in the device to be stopped when the data transfer or the data processing is not carried out. Therefore, the operation clocks of the moving image data processing system and the graphics image data processing system can be separately controlled in accordance with the data transfer of the moving image data or the graphics image data, whereby the power consumption can be reduced significantly.

According to a 19th aspect of the present invention, there is provided an image output control method for controlling output of image data from the image output device of the 10th aspect to an image display device comprising: storing the display image data in the line buffer in a period except for a blanking period of a horizontal synchronous signal among signals for use in image output to the image display device; transferring the display image data from the line buffer to the frame memory in the blanking period of the horizontal synchronous signal; and outputting the display image data from the frame memory to the image display device in a period except for the blanking period of the horizontal synchronous signal. Therefore, the control is exerted to store the data in the frame memory and output the stored data immediately by utilizing the effective period of the horizontal synchronous signal, thereby reducing the frame delay, as well as the repetitive display in the next frame can be also performed, and the access contention to the frame memory can be avoided, whereby the system control can be easily executed. Further, one frame of the data can be stored in the frame memory to reduce the operation time, thereby reducing the power consumption.

According to a 20th aspect of the present invention, there is provided an image output control method for controlling output of image data from the image output device of the 11th aspect to an image display device comprising: storing the display image data in the frame memory in a period except for the blanking period of a horizontal synchronous signal among signals for use in image output to the image display device; transferring the display image data from the frame memory to the line buffer in the blanking period of the horizontal synchronous signal; and outputting the display image data from the line buffer to the image display device in a period except for the blanking period of the horizontal synchronous signal. Therefore, the control is exerted to store the data in the frame memory and immediately output the stored data with utilizing the effective period of the horizontal synchronous signal, thereby reducing the frame delay, as well as the repetitive display in the next frame can be also performed, and the access contention to the frame memory can be avoided, whereby the system can be easily controlled. Further, one frame of the data are stored in the frame memory to reduce the operation time, whereby the power consumption can be reduced.

According to a 21st aspect of the present invention, there is provided an image output control method for controlling output of image data from the image output device of the 13th aspect to an image display device comprising: storing the display moving image data and the display graphics image data in the moving image line buffer and the graphics line buffer, respectively, in a period except for the blanking period of a horizontal synchronous signal among signals for use in image output to the image display device; transferring the display moving image data and the display graphics image data from the moving image line buffer and the graphics line buffer to the moving image frame memory and the graphics frame memory, respectively, in the blanking period of the horizontal synchronous signal; and composing the display moving image data and the display graphics image data to be output to the image display device in a period except for the blanking period of the horizontal synchronous signal. Therefore, the control is exerted to store the data in the frame memory and immediately output the stored data by utilizing the effective period of the horizontal synchronous signal, thereby reducing the frame delay, as well as the repetitive display in the next frame can be also performed, and the access contention to the frame memory can be avoided, whereby the system can be easily controlled. Further, one frame of the data are stored in the frame memory to reduce the operation time, whereby the power consumption can be reduced.

According to a 22nd aspect of the present invention, there is provided an image output control method for controlling output of image data from the image output device of the 14th aspect to an image display device comprising: storing the display moving image data and the display graphics image data in the moving image frame memory and the graphics frame memory, respectively, in a period except for a blanking period of a horizontal synchronous signal among signals for use in image output to the image display device; transferring the display moving image data and the display graphics image data from the moving image frame memory and the graphics frame memory to the moving image line buffer and the graphics line buffer, respectively, in the blanking period of the horizontal synchronous signal; and composing the display moving image data and the display graphics image data or separately outputting the same to the image display device in a period except for the blanking period of the horizontal synchronous signal. Therefore, the control is exerted to output the data which are stored in the frame memory to the line buffer with utilizing the effective period of the horizontal synchronous signal, the data of a line which is generated in the video processing unit can be output in the next line, whereby no data access contention to the frame memory occurs, and the frame delay can be reduced. Further, one frame of the data can be stored in the frame memory to reduce the operation time, thereby reducing the power consumption.

According to a 23rd aspect of the present invention, there is provided an image output control method for controlling output of image data from the image output device of the 15th aspect to an image display device comprising: storing the display moving image data and the display graphics image data in the moving image frame memory and the graphics frame memory, respectively, in a period except for a blanking period of a horizontal synchronous signal among signals for use in image output to the image display device; composing output data from the moving image frame memory and output data from the graphics frame memory to be transferred to the line buffer in the blanking period of the horizontal synchronous signal; and outputting the data stored in the line buffer to the image display device in a period except for the blanking period of the horizontal synchronous signal. Therefore, the control is exerted to store the data in the frame memory and immediately output the stored data with utilizing the effective period of the horizontal synchronous signal, thereby reducing the frame delay, as well as the repetition display in the next frame can be also performed, and the access contention to the frame memory can be avoided, whereby the system can be easily controlled. Further, one frame of the data can be stored in the frame memory to reduce the operation time, whereby the power consumption can be reduced.

According to a 24th aspect of the present invention, there is provided an image output control method for controlling output of image data from the image output device of the 16th aspect to an image display device comprising: transferring data stored in the moving image line buffer and data stored in the graphics line buffer to the moving image frame memory and the graphics frame memory, respectively, in a half of a blanking period of a horizontal synchronous signal among signals for use in image output to the image display device; and composing output data from the moving image frame memory and output data from the graphics frame memory to be transferred to the line buffer in the other half of the blanking period of the horizontal synchronous signal. Therefore, the control is exerted to store the data in the frame memory and immediately output the stored data with utilizing the effective period of the horizontal synchronous signal, thereby reducing the frame delay, as well as the repetition display in the next frame can be also performed, and the access contention to the frame memory can be avoided, whereby the system can be easily controlled. Further, one frame of the data can be stored to reduce the operation time, thereby reducing the power consumption.

According to a 25th aspect of the present invention, there is provided an image output control method for controlling output of image data from the image output device of the 17th aspect to an image display device comprising: transferring the data stored in the first moving image line buffer and the data stored in the first graphics line buffer to the moving image frame memory and the graphics frame memory, respectively, in a half of a blanking period of a horizontal synchronous signal among signals for use in image output to the image display device; and transferring the data stored in the moving image frame memory and the data stored in the graphics frame memory to the second moving image line buffer and the second graphics line buffer, respectively, in the other half of the blanking period of the horizontal synchronous signal. Therefore, the control is exerted to store the data in the moving frame memory and the graphics frame memory and immediately output the stored data with utilizing the effective period of the horizontal synchronous signal, thereby reducing the frame delay, as well as the repetition display in the next frame can be also performed, and the access contention to the moving image frame memory and the graphics frame memory can be avoided, whereby the system can be easily controlled. Further, one frame of the data can be stored in the frame memories to reduce the operation times, whereby the power consumption can be reduced.

DETAILED DESCRIPTION OF THE PREFERRED EMBODIMENTS

Hereinafter, embodiments of the present invention will be described with reference to the drawings. The embodiments described below are only representatives, and the present invention is not limited to these embodiments.

[Embodiment 1]

Hereinafter, an image output device according to the first embodiment of the present invention is described with reference to FIG. 1.

Figure 1:
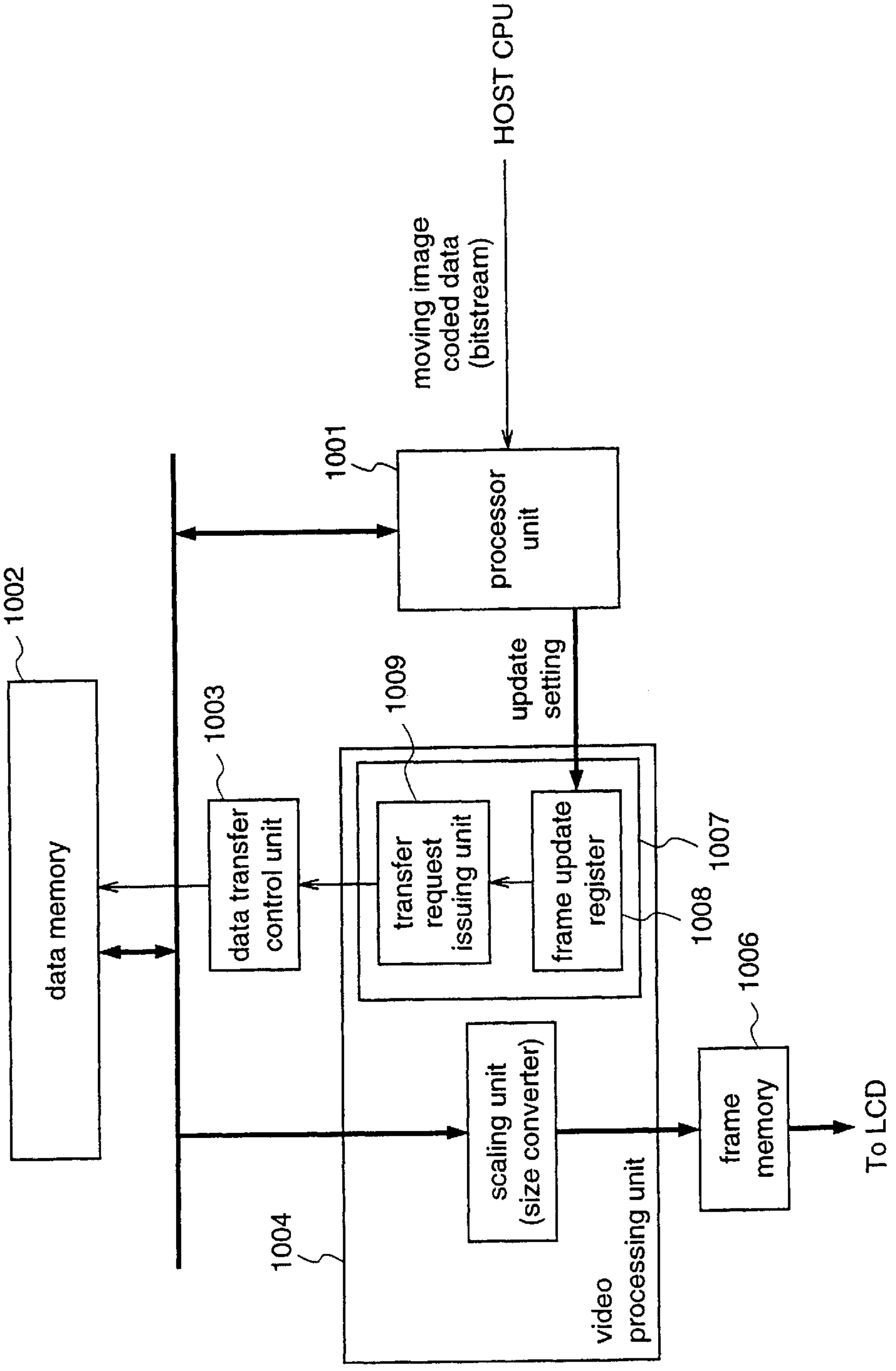
FIG. 1 is a block diagram illustrating a structure of an image output device according to a first embodiment of the present invention.

FIG. 1 is a block diagram illustrating a structure of the image output device of the first embodiment.

In FIG. 1, a processor unit 1001 controls the device in its entirety, and carries out a decoding process for input moving image coded data. A data memory 1002 contains image data. A data transfer control unit 1003 controls data transfer between the data memory 1002 and a video processing unit 1004. The video processing unit 1004 carries out an image processing for the image data which are stored in the data memory 1002, to generate display image data. A frame memory 1006 temporarily contains one frame of the display image data. A data transfer request control circuit 1007 comprises a frame update register 1008 for deciding a cycle of issuing the data transfer request and a data transfer request issuing unit 1009 for periodically issuing the data transfer request, and controls the data transfer request.

Next, the operation of the so-constructed image output device is described.

The processor unit 1001 decodes a bitstream (moving image coded data) which has been transferred from the host CPU, and outputs image data to the data memory 1002.

In addition, when the processor unit 1001 has generated image data of a new frame, the processor unit 1001 sets the frame update register 1008 at 1. Then, the data transfer request issuing unit 1009 issues a data transfer request in units of line, from the beginning of the nest frame, and outputs the same to the data transfer control unit 1003. The data transfer control unit 1003 controls the data memory 1002 so as to transfer image data from the data memory 1002 to the video processing unit 1004 in line units, in accordance with the data transfer request.

The image data which have been transferred from the data memory 1002 are subjected to a scaling process in the video processing unit 1004 to be suited to the screen size of an image display device, for example a liquid crystal display (LCD), and successively written in the frame memory 1006 as the display image data, and the display image data are periodically output from the frame memory 1006 to the LCD frame by frame.

When the data transfer of one frame is completed, the frame rate update register 1008 turns 0, and the data transfer request issuing unit 1009 stops the issue of the data transfer request to the data transfer control unit 1003.

In this image output device according to the first embodiment, only when the processor unit 1001 has generated image data to be updated, the processor unit 1001 sends an update instruction to the frame update register 1008, and the data transfer request control unit 1007 automatically issues a data transfer request for transferring one frame of image data. Therefore, without strict transfer control exerted by the processor unit 1001, the transfer of image data can be enabled under the minimum control, and consequently the operation ratios of the data transfer control unit 1003, the video processing unit 1004 and a data transfer bus can be reduced. Further, since the display images can be stored in the frame memory 1006, the image display for the LCD can be output frame by frame, while the consumed power can be reduced.

When a LCD having a frame memory is used as the image display device, and the output data of the video processing unit 1004 are directly input to the image display device, it is not required to provide the frame memory 1006 in the image output device, whereby more effects can be obtained.

[Embodiment 2]

Hereinafter, an image output device according to the second embodiment of the present invention is described with reference to FIGS. 2, 3, 4 and 5.

Figure 2:
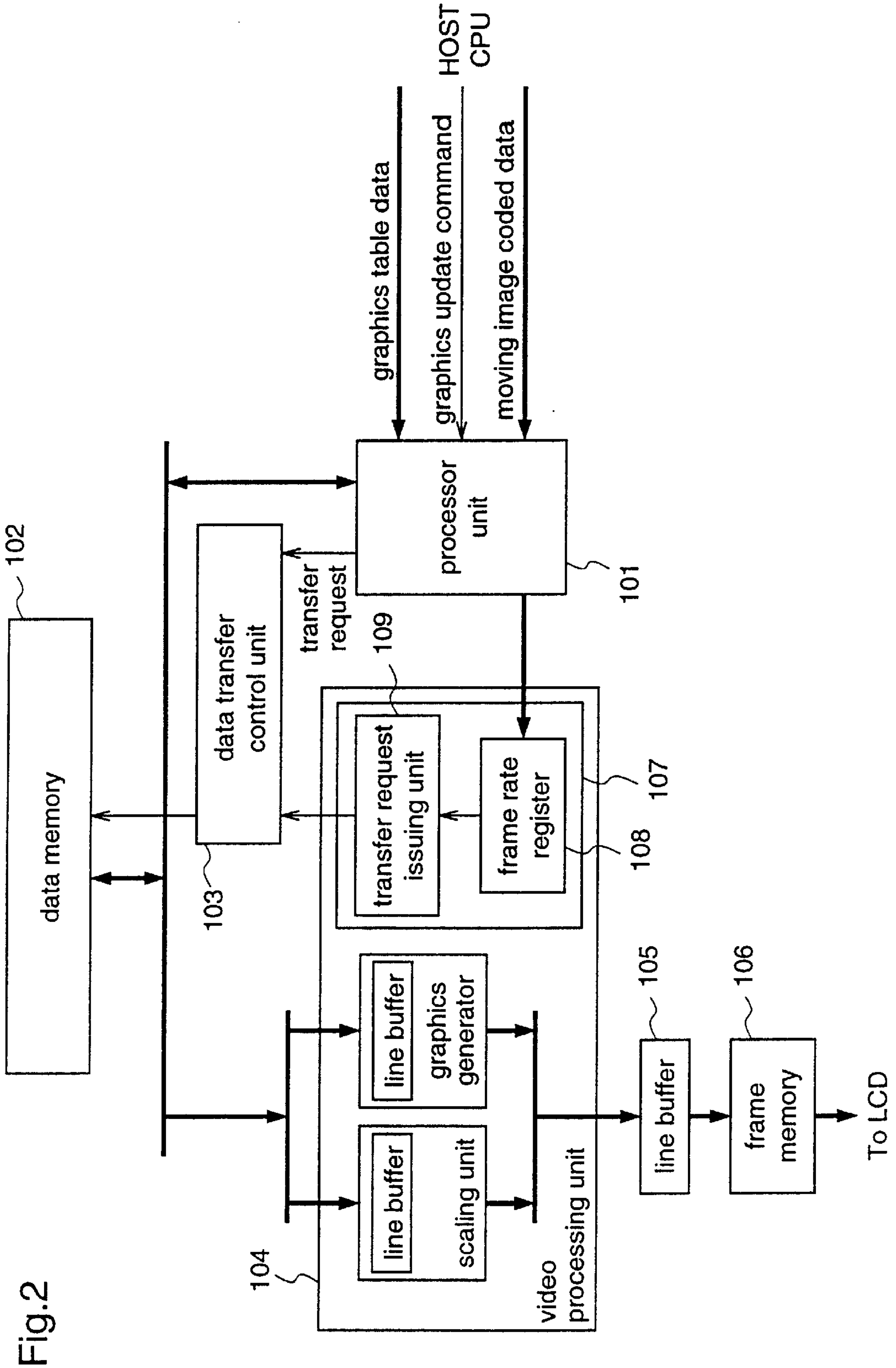
FIG. 2 is a block diagram illustrating a structure of an image output device according to a second embodiment of the present invention.

FIG. 2 is a block diagram illustrating a structure of the image output device of the second embodiment.

In FIG. 2, a processor unit 101 controls the device in its entirety. A data memory 102 contains image data such as data to be decoded, moving image data which are obtained by decoding compressed moving image coded data, and graphics table data. A data transfer control unit 103 controls data transfer between the data memory 102 and a video processing unit 104. The video processing unit 104 comprises a scaling unit for scaling moving image data to generate display moving image data, and a graphics generation unit for generating display graphics image data from the graphics table data, and carries out an image processing for the image data which are transferred from the data memory 102. A line buffer 105 temporarily contains one line of display image data which are obtained by composing the display moving image data and the display graphics image data. A frame memory 106 contains output data of the line buffer 105 line by line while outputting the data to the image display device, for example a liquid crystal display (LCD), at 60 Hz. A data transfer request control circuit 107 comprises a frame rate register 108 for deciding a cycle of issuing the data transfer request, and a data transfer request issuing unit 109 for periodically issuing the data transfer request.

Figure 3:
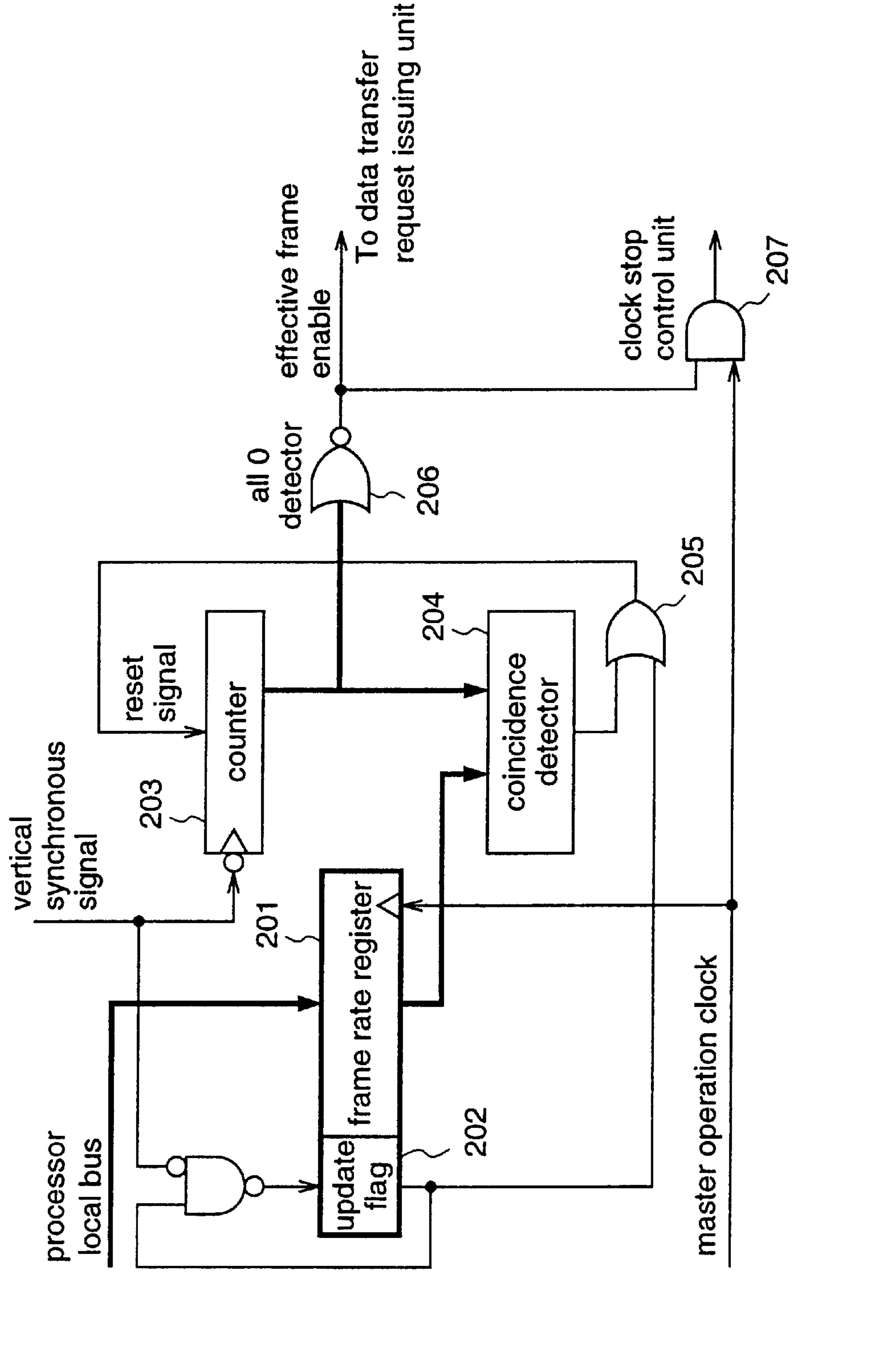
FIG. 3 is a diagram illustrating an example of a structure of a frame rate register.

FIG. 3 is a diagram illustrating a structure of the frame rate register 108.

In FIG. 3, a frame rate register 201 is lower bits except for a most significant bit, and decides a transfer cycle. An update flag 202 is the most significant bit. A counter 203 counts start judgement timing for issuing the data transfer request. Numeral 204 denotes a cycle coincidence detector. An OR circuit 205 obtains an OR between the update flag 202 and a result of the coincidence detection. An AND circuit 206 outputs an enable signal which is an effective frame in a case where the counter values are all 0. A clock stop control unit 207 stops a clock for activating the entire video processing unit 104.

In the so-constructed frame rate register 108, in a case where the most significant bit is effective, the counter 203 is reset, and the update flag 202 as the most significant bit is reset to an invalid value at the issue start judgement timing of the next data transfer request, as well as the counter 203 counts again the cycle which is decided by the lower bits. As described above, the setting of the frame register and the counter is automated, whereby the transfer cycle and update can be easily set, and no resetting is required.

Figure 4:
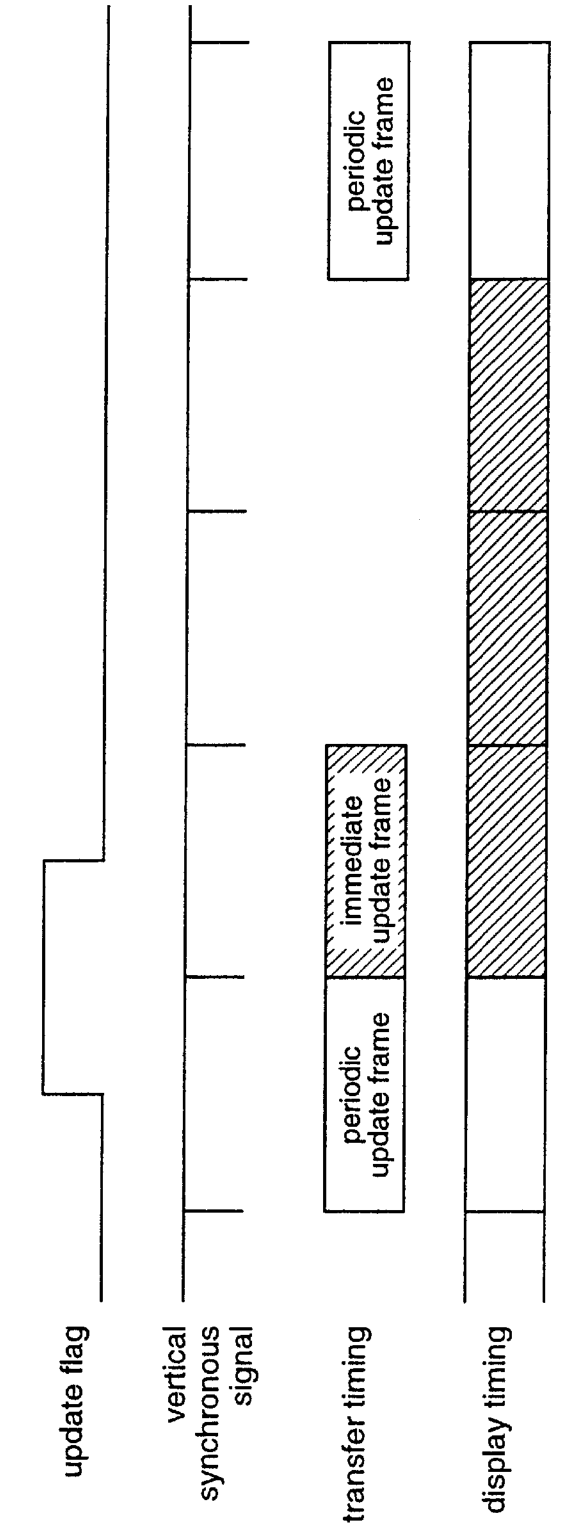
FIG. 4 is a diagram showing a relationship between an image output frame cycle and an update flag.

FIG. 4 is a diagram showing the relationship of a vertical synchronous signal of the LCD, a timing of data transfer from the data memory 102 to the frame memory 106, and a timing of display data output from the data memory 102.

As shown in FIG. 4, when the update flag 202 is set in the frame rate register 108 by the processor unit 101, the data transfer request issuing unit 109 issues the data transfer request at the next image output frame timing to the image display device, regardless of the transfer cycle which is set in the frame rate register 201.

To be more specific, it is judged at a timing of the next vertical synchronous signal among signals for use in image output to the image display device, that the update flag 202 is effective, and this frame is decided to be an image transfer frame. Accordingly, the issuing of the data transfer request can be judged in frame units, whereby the system can be controlled easily and accurately. Accordingly, the disturbance in images hardly occurs.

Then, when the update flag 202 is set in the frame rate register 108, the data transfer request issuing unit 109 issues the data transfer request immediately at the issue start judgement timing, regardless of the transfer cycle which is set in the frame rate register 201. Thereby, random data transfer requests can be immediately issued with retaining the periodic issue cycle of the data transfer request.

Figure 5:
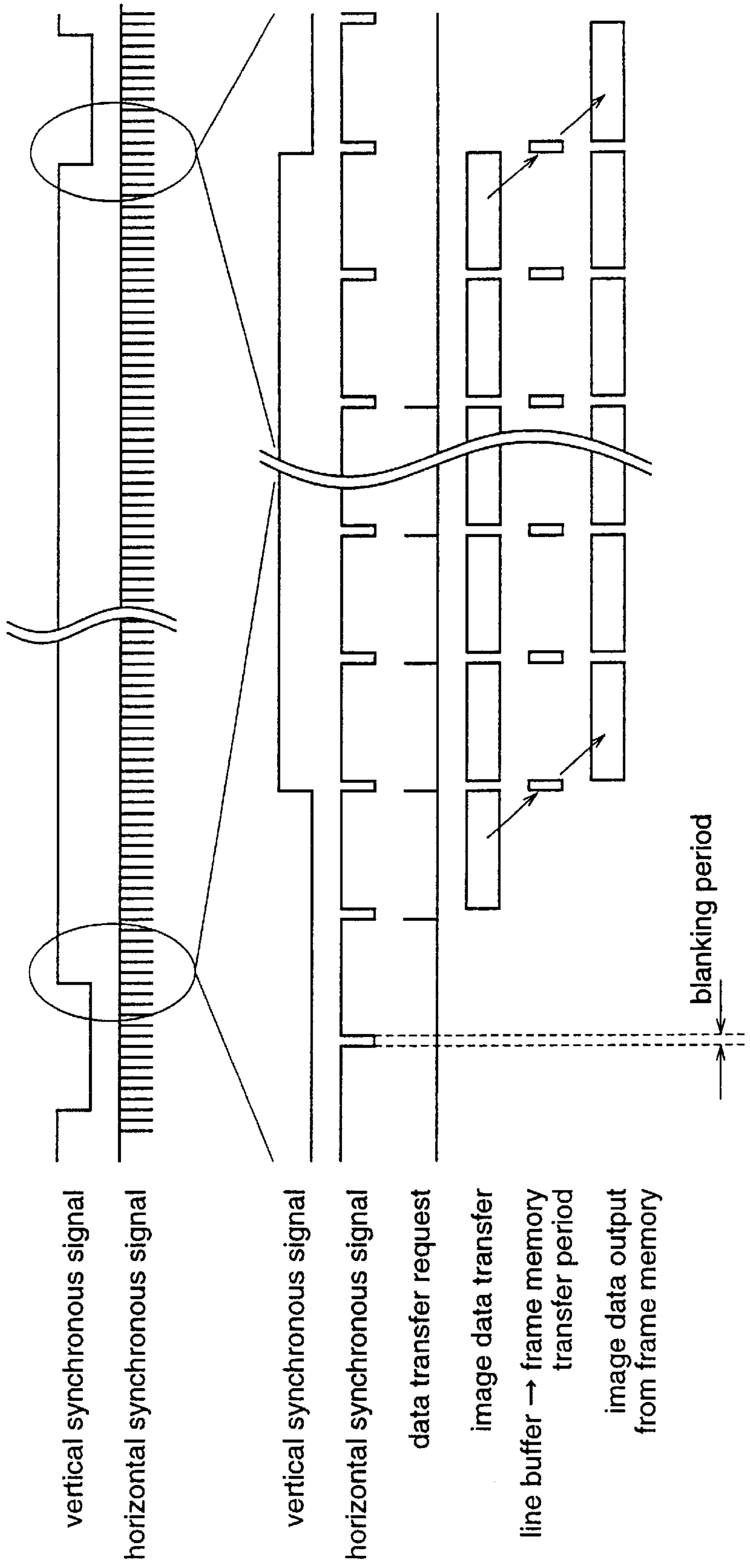
FIG. 5 is a diagram showing a relationship between a horizontal synchronous signal of a LCD and a data transfer timing.

FIG. 5 shows the relationship of a horizontal synchronous signal of the LCD, a timing of data transfer from the data memory 102 to the video processing unit 104, a timing of storage into the line buffer 105, a timing of data transfer from the line buffer 105 to the frame memory 106, and a timing of image output from the frame memory 106. A period "L" of the horizontal synchronous signal of the LCD is referred to as a blanking period.

Next, the operation of the image output device according to the second embodiment is described.

When moving image coded data are transferred from the host CPU, the processor unit 101 carries out the decoding process for the moving image coded data using the data memory 102, and stores moving image data in the data memory 102. When graphics table data are transferred from the host CPU, the data are directly stored in the data memory 102.

Next, the processor unit 101 sets the frame rate register 108 at a value indicating 15 Hz which is a decoded image rate. Here, "15 Hz" means one transfer every four frames with reference to the vertical synchronous signal of the LCD, as shown in FIG. 4. That is, the data transfer is effective once every four frames. Therefore, the frame register 201 is set at 3.

In the case of a frame whose transfer is effective, as shown in FIG. 5, the data transfer request issuing unit 109 issues the data transfer request to the data transfer control unit 103, from a timing immediately preceding a timing when the vertical synchronous signal of the LCD becomes effective, in accordance with a timing of the horizontal synchronous signal. Thereby, the timing of the data transfer request issue can be easily controlled without using a special timing generator, and the issue of the data transfer request can be controlled in a periodic transfer cycle. Accordingly, the transfer request issue using the hardware can be easily realized.

When the transfer request is issued, the data transfer control unit 103 controls the data memory 102 so as to transfer the moving image data and the graphics table data to the video processing unit 104.

Each of the moving image data and the graphics table data which have been transferred as described above are subjected to the scaling process and the graphics generation process in the video processing unit 104, to generate display image data such as display moving image data and display graphics image data. In the scaling process, the moving image data are enlarged from the QCIF (176×144) size to the CIF (352×288) size. In the graphics generation process, a luminance signal and a color difference signal are generated from the graphics table data in pixel units, according to the table values.

One of the display moving image data and display graphics image data are selected to be composed the generated display image data pixel by pixel, and one line of the display image data are successively stored in the line buffer 105 in the effective period of the horizontal synchronous signal.

Next, the line buffer 105 burst-transfers the stored display image data to the frame memory 106 in units of one line in the next stage, in the blanking period of the horizontal synchronous signal among image output synchronous signals to the image display device.

The frame memory 106 outputs the stored one frame of the display image data in units of one line, from a timing when the blanking period of the horizontal synchronous signal ends (a timing when the effective period of the horizontal synchronous signal is started), in accordance with pixel clock timing of the LCD.

The writing into the frame memory 106 is not carried out in cycles other than the 15-Hz transfer cycle, and the display image data are repeatedly output from the frame memory 106 to the LCD. At this time, the operation clock of the video processing unit 104 is stopped by the clock stop control unit 207 in FIG. 3.

Next, a description is given of a case where a graphics update command is issued together with the graphics table data from the host CPU.

The processor unit 101 sets the update flag 202 of the frame rate register 108 at 1. That is, in the frame rate register 201, when the most significant bit as the update flag 202 turns 1, the counter 203 is reset at a falling edge (frame start timing) of the next vertical synchronous signal.

When the counter 203 is all 0, the AND circuit 206 outputs an enable signal indicating the data transfer effective period, to the data transfer request issuing unit 109. At this time, the clock stop control unit 207 exerts a control to supply an operation clock.

The update flag 202 has a mechanism which is automatically reset to 0, and after the frame updating, the data transfer is repeated again in a set issue cycle.

In the image output device according to the second embodiment, the data transfer request is issued in a fixed cycle which is set in the frame register 108, to update the display image data which are stored in the frame memory 106. In cases where images which are to be updated immediately such as graphics image data appear, when the update flag is set in the frame register 108, the data transfer request is issued at timing of the next image output frame to the image display device, regardless of the issue cycle which is set in the frame rate register 108. Therefore, the display image can be updated immediately, and the delay before the data display from the user's operation can be reduced, whereby no unnatural video is provided.

Further, since the line buffer 105 is provided in the previous stage of the frame memory 106, and the display image data are transferred from the line buffer 105 to the frame memory 106 in the blanking period of the horizontal synchronous signal and output to the LCD in the effective period of the horizontal synchronous signal, the timing of writing the display image data into the frame memory can be easily controlled, and the composition and display of the display images can be realized by one frame memory, and further the frame delay before the transferred image data are displayed can be dispensed with.

In this second embodiment, when the image display device is realized by a LCD, and the frame memory 106 and the data memory 102 are realized by DRAMs, the space can be saved as well as the consumed power can be reduced with maintaining the large quantity of image data.

Further, in this second embodiment, when an operational clock control means is provided to stop the operational clocks of the line buffer 105, the video processing unit 104 and the frame memory 106 in the non-transfer period except for the transfer cycle which is set in the frame rate register 201, the consumed power can be reduced.

[Embodiment 3]

Hereinafter, an image output device according to the third embodiment of the present invention is described with reference to FIGS. 6 and 7.

The difference between the second embodiment and the third embodiment is that the line buffer is provided in the previous stage of the frame memory in the second embodiment while the line buffer is provided in the later stage of the frame memory in the third embodiment.

Figure 6:
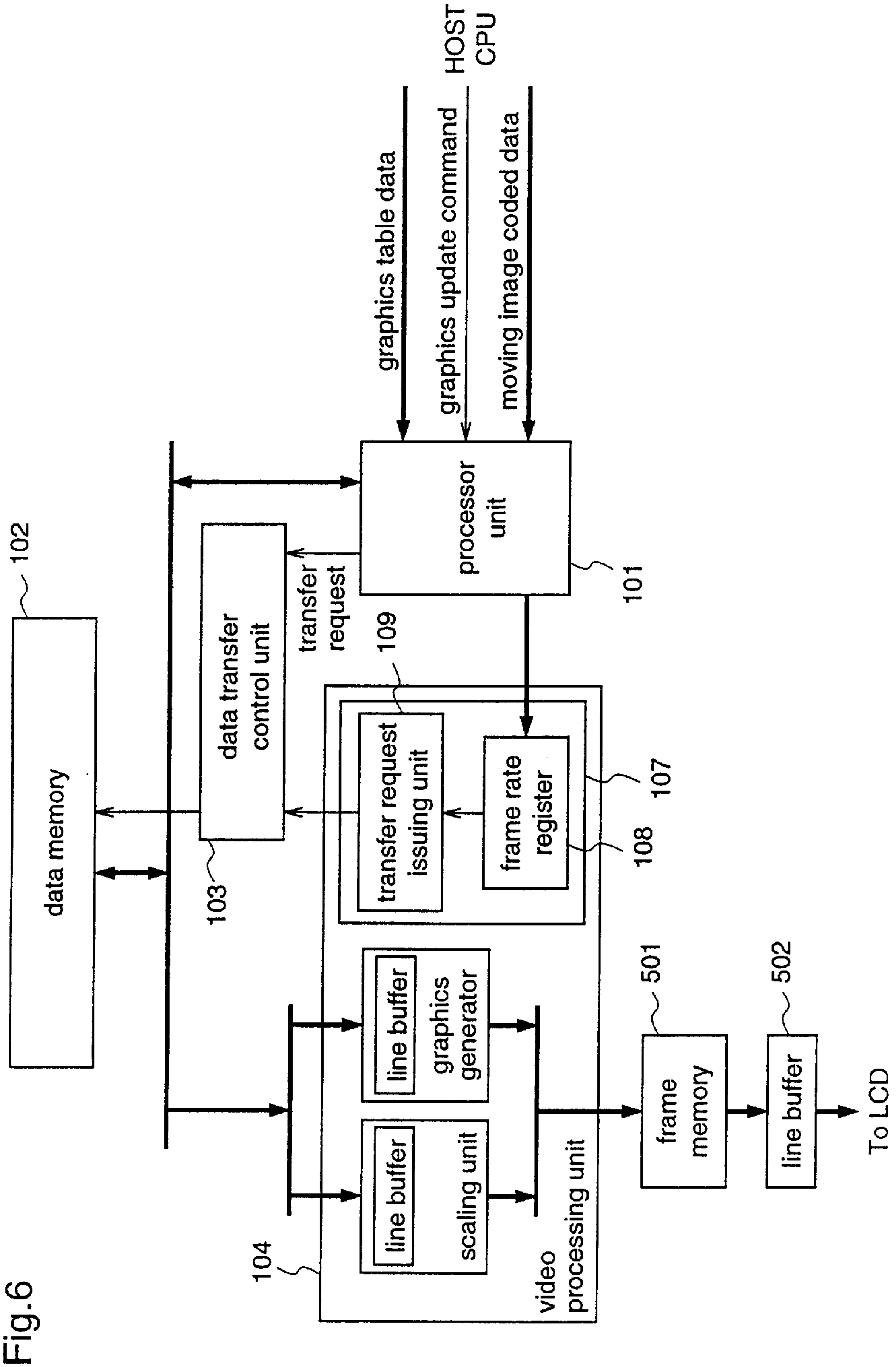
FIG. 6 is a block diagram illustrating a structure of an image output device according to a third embodiment of the present invention.

FIG. 6 is a block diagram illustrating the image output device of the third embodiment. In FIG. 6, the same reference numerals as those in FIG. 2 denote the same or corresponding elements.

A frame memory 501 successively contains one frame of display image data which are obtained by composing the display moving image data and the display graphics image data. A line buffer 502 is constituted by for example a SRAM, and 60 pieces of the display image data per sec are transferred from the frame memory 501 and successively stored in the line buffer 502, in units of one line, in synchronization with the horizontal synchronous signal.

Figure 7:
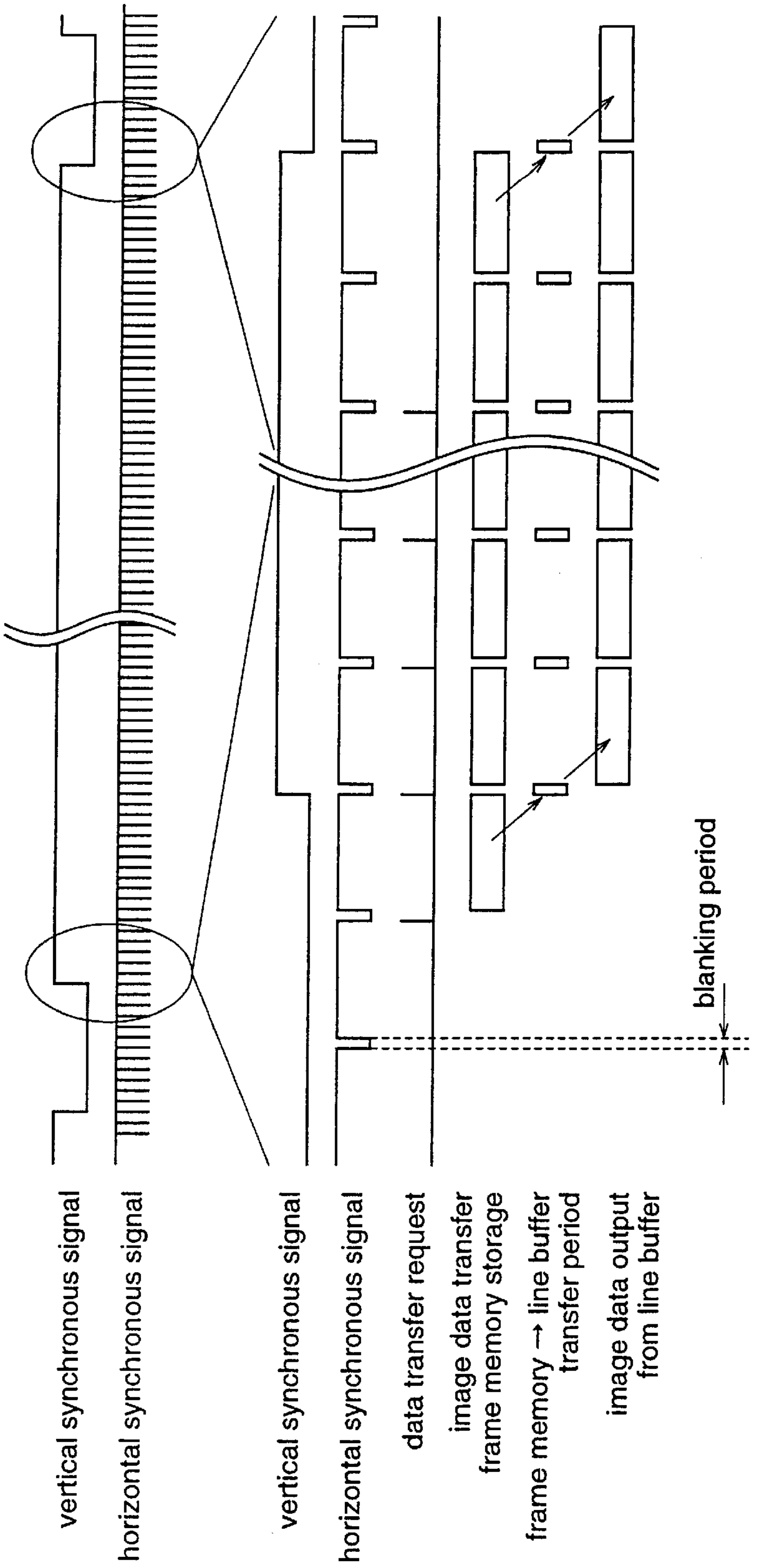
FIG. 7 is a diagram showing a relationship between a horizontal synchronous signal of a LCD and a data transfer timing.

FIG. 7 shows the relationship of the horizontal synchronous signal of the LCD, a timing of data transfer from the data memory 102 to the video processing unit 104, a timing of storage into the frame memory 501, a timing of data transfer from the frame memory 501 to the line buffer 502, and a timing of image output from the line buffer 502. The period "L" of the horizontal synchronous signal of the LCD is referred to as a blanking period.

Next, the operation of the image output device of the third embodiment is described.

As described in the second embodiment, the moving image data and the graphics table data which are transferred from the data memory 102 are each subjected to the image processing by the video processing unit 104, whereby the display moving image data and the display graphics image data are generated.

To compose the generated display image data pixel by pixel, one of the display moving image data and the display graphics image data are selected, and one line of the display image data are stored in the frame memory 501 in an effective period of the one horizontal synchronous signal. When this process is repeated, one frame of the display image data are stored in the frame memory 501.

The frame memory 501 transfers the stored one line of data to the line buffer 502 of the later stage in the blanking period of the next horizontal synchronous signal. The line buffer 502 outputs the image data pixel by pixel from the timing of line start after the end of the blanking period, in accordance with the horizontal synchronous signal and the display pixel cycle.

Like in the second embodiment, when the processor unit 101 sets the frame rate register 108, i.e., the update flag 202, the update flag 202 is judged at the start timing of the next vertical synchronous signal. Then, the counter 203 is reset, and an effective frame enable signal is output. Upon receipt of this, the data transfer request issuing unit 107 issues the data transfer request to the data transfer control unit 103 in the next frame period. Accordingly, the data can be immediately displayed.

Further, like in the second embodiment, the video processing unit 104 and the line buffer 502 are controlled by the clock stop control unit 207 to stop the clocks, whereby the power consumption can be reduced.

In the image output device according to the third embodiment, the data transfer request is issued in a fixed cycle which is set in the frame register 108, to update the display image data which are stored in the frame memory 106. In cases where images which are to be updated immediately such as graphics image data appear, when the processor unit 101 sets an update flag in the frame rate register 108, the data transfer request is issued at the timing of the next image output frame to the image display device, regardless of the issue cycle which is set in the frame rate register 108. Therefore, the display image can be updated immediately, and the delay before the data display from the user's operation can be reduced, whereby no unnatural video is provided.

Further, the line buffer 502 is provided in the later stage of the frame memory 501, the data transfer from the frame memory 501 to the line buffer 502 is performed in the blanking period of the horizontal synchronous signal among the signals for use in image output to the image display device, and one line of the image data are output from the line buffer 502 in periods except for the blanking period of the horizontal synchronous signal. Therefore, when the data are output to the image display device, it is unnecessary to exert the control by a RAS or CAS like the frame memory, whereby the control on the data output timing can be more easily executed than it is executed directly from the frame memory. Further, in a period during which the data transfer from the data memory 102 is not executed, no data are written in the frame memory 601, whereby the operating time of the frame memory 501 can be significantly reduced.

[Embodiment 4]

Hereinafter, an image output device according to the fourth embodiment of the present invention is described with reference to FIGS. 8 and 10.

Figure 8:
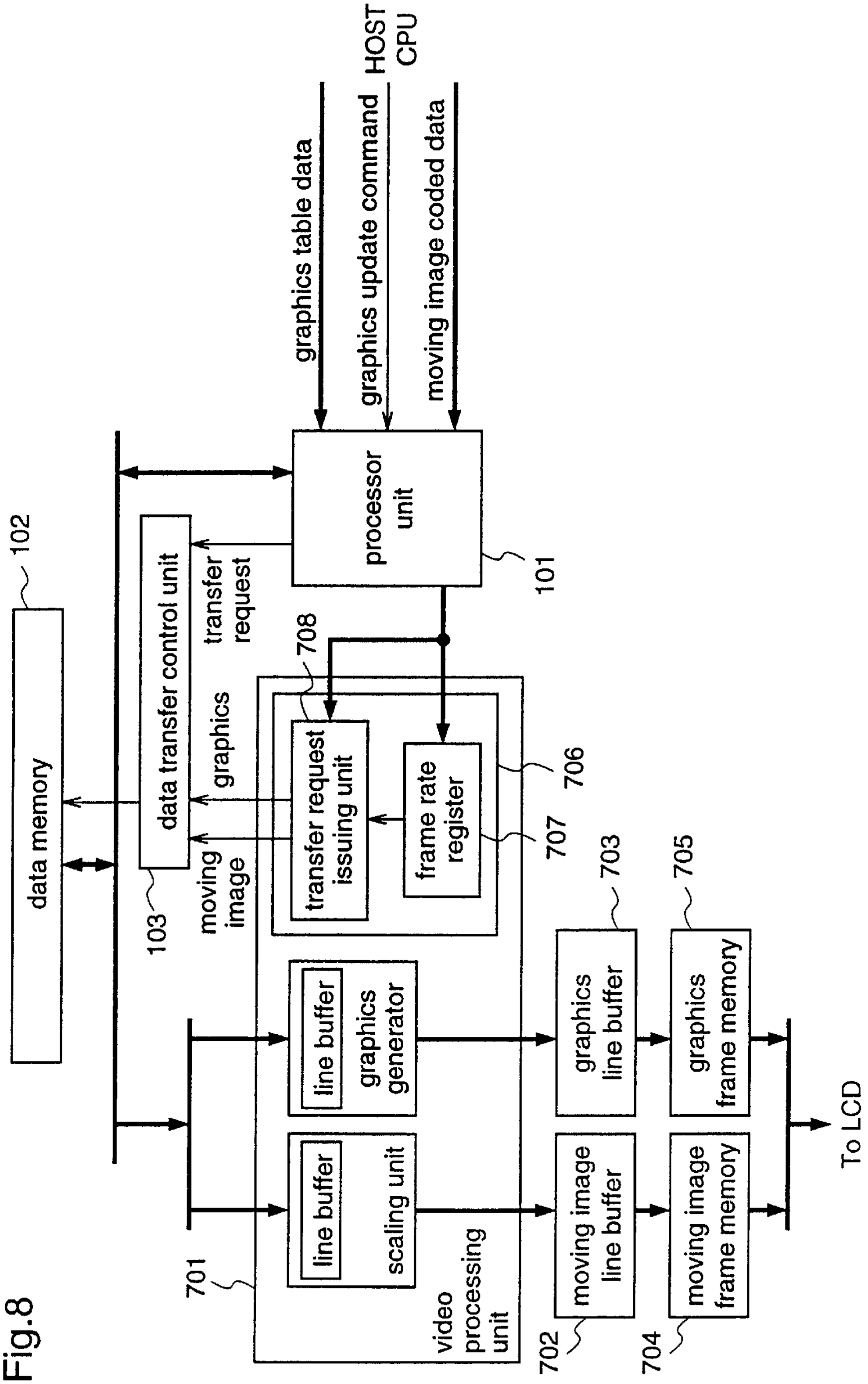
FIG. 8 is a block diagram illustrating a structure of an image output device according to a fourth embodiment of the present invention.

FIG. 8 is a diagram illustrating a structure of the image output device of the fourth embodiment. In FIG. 8, the same reference numerals as those in FIG. 2 denote the same or corresponding elements.

A video processing unit 701 carries out a scaling process for scaling moving image data which are transferred from the data memory 102 to generate display moving image data, and a graphics generation process for generating display graphics image data from graphics table data which are transferred from the data memory 102.

A moving image line buffer 702 temporarily contains one line of the display moving image data. A graphics line buffer 703 temporarily contains one line of the display graphics image data, and this is constituted, for example, by a SRAM. A moving image frame memory 704 transfers the data in the moving image line buffer 702 in the blanking period of the horizontal synchronous signal, and contains one frame (288 lines) of the data. A graphics frame memory 705 transfers the data in the graphics line buffer 703 in the blanking period of the horizontal synchronous signal, and contains one frame of the data.

A data transfer request control circuit 706 comprises a frame rate register 707 and a data transfer request issuing unit 708.

Figure 10:
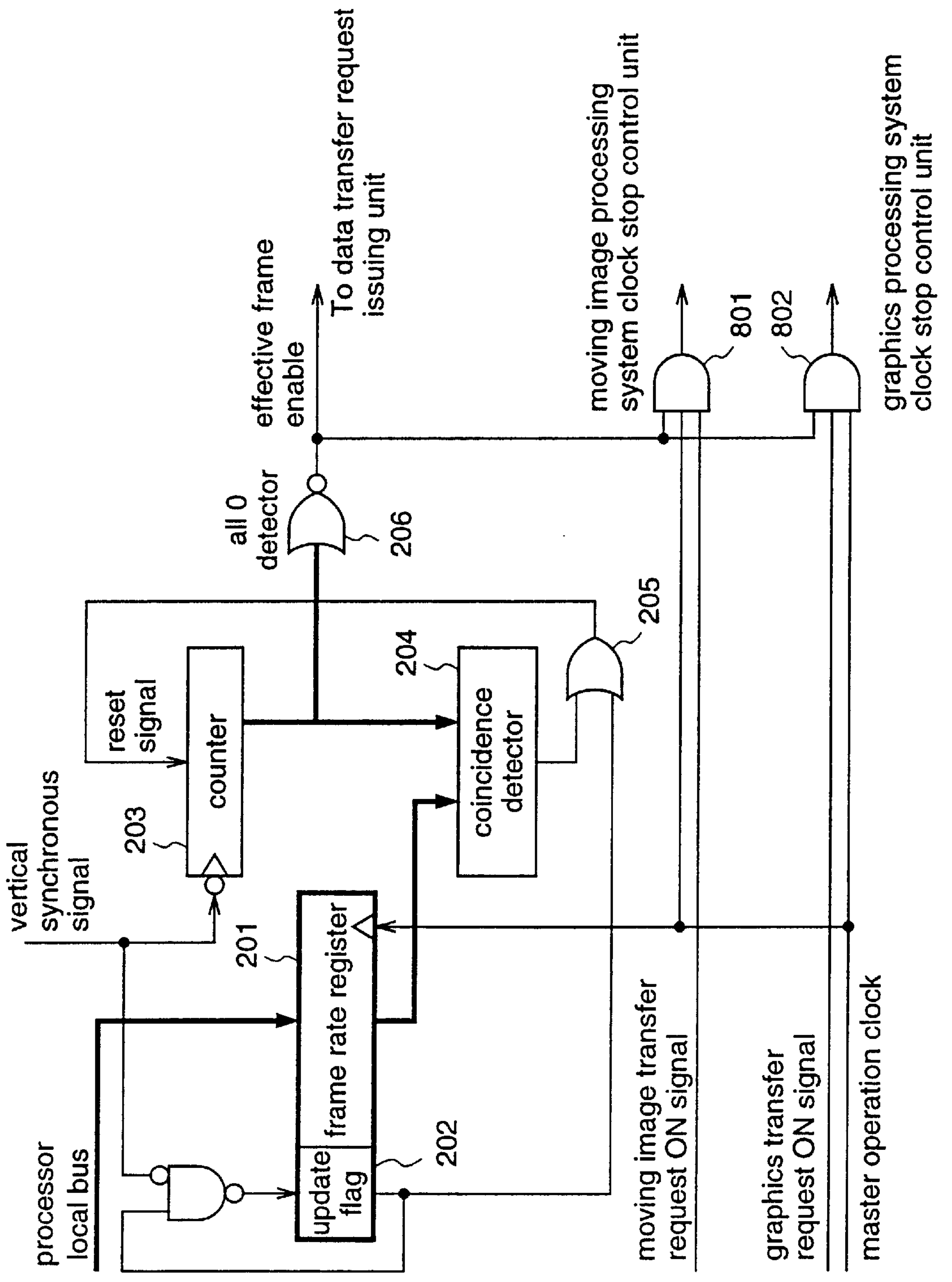
FIG. 10 is a diagram illustrating an example of a structure of a frame rate register.

The frame rate register 707 decides the cycle of issuing the data transfer request, is constituted as shown in FIG. 10, and includes an update flag 202 for immediately updating an image frame.

The data transfer request issuing unit 708 receives an effective frame enable signal from the frame rate register 707, and issues a data transfer request to the data transfer control unit 103. In addition, the data transfer request issuing unit 708 comprises a moving image transfer register for deciding whether the moving image data transfer is effective or invalid, and a graphics transfer register for deciding the graphics data transfer is effective or invalid. The update flag 202 is set in the frame rate register 706 by the processor unit 101, and only when the moving image transfer register or the graphics transfer register is effective, the corresponding data transfer request is issued. Each of the moving image transfer and the graphics transfer is switched ON or OFF under the control of the processor unit 101, and no data transfer request is issued when it is OFF.

FIG. 10 is a diagram illustrating a frame rate register. In FIG. 10, the same reference numerals as those in FIG. 3 denote the same or corresponding elements.

A moving image processing system clock stop control unit 801 exerts a control to stop a clock for activating a moving image processing system circuit in the video processing unit 701 and the moving image line buffer 702. Further, also when the moving image transfer of the data transfer request issuing unit 708 is OFF, the clock is stopped.

A graphics processing system clock stop control unit 802 exerts a control to stop a clock for activating the graphics processing system circuit in the video processing unit 701 and the graphics line buffer 703. Also when the graphics transfer of the data transfer request issuing unit 708 is OFF, the clock is stopped.

Next, the operation of the image output device of the fourth embodiment is described.

The processor unit 101 carries out a process for decoding images using the data memory 102, and stores decoded images in the data memory 102. In addition, the graphics table data are transferred from the host CPU, and stored in the data memory 102.

The processor unit 101 sets the frame rate register 707 at a value indicating 15 Hz which is a decoded image rate. "15 Hz" means one transfer every four frames with reference to the vertical synchronous signal of the LCD, as shown in FIG. 4. That is, the data transfer is effective once every four frames. Therefore, the frame rate register 201 is set at 3. Further, it is set in the data transfer request issuing unit 708 that the transfer is switched to ON only in the case of data which are to be transferred. Here, normally assuming only displays of decoded images (moving images), it is set that the moving image transfer is ON and the graphics transfer is OFF.

In the case of a frame whose transfer is effective, as shown in FIG. 4, the data transfer request issuing unit 708 issues a data transfer request from a timing immediately preceding the timing when the vertical synchronous signal of the LCD becomes effective, in accordance with the timing of the horizontal synchronous signal. At this time, the transfer request is issued only for the moving image data, and the transfer of the graphics data are not performed.

One line of the moving image data which are transferred as described above are subjected to the scaling process in the video processing unit 701 in the effective period except for the blanking period of the horizontal synchronous signal, and enlarged from the QCIF (176×144) size to the CIF (352×288) size. Further, the processed moving image data are stored in the moving image line buffer 702 as the display moving image data.

The one line of the display image data which have been stored in the moving image line buffer 702 are transferred in the moving image frame memory 704 all at once in the blanking period of the horizontal synchronous signal, and output to the external LCD in the effective period except for the blanking period of the horizontal synchronous signal, in accordance with the synchronous signal and the pixel output timing.

Further, the writing into the moving image frame memory 704 is not carried out in cycles other than the 15-Hz transfer cycle, and the display image data are repeatedly output from the moving image frame memory 704 to the LCD.

In addition, in the case of transfer cycle other than the 15-Hz transfer cycle, the operation clocks of the video processing unit and the line buffer in the graphics transfer system, in which the transfer is switched OFF by the data transfer request issuing unit 708, are stopped by the graphics processing system clock stop control unit 802 in FIG. 10.

Next, a description is given of a case where a graphics update command is issued from the host CPU in conjunction with the graphics table data.

The processor unit 101 sets the ON of the graphic transfer in the data transfer request issuing unit 708, and sets the update flag 202 of the frame rate register 707 at 1. At this time, when it is not required to update the display moving image data and only the display graphics image data are to be changed, the OFF of the moving image transfer is set in the data transfer request issuing unit 708.

The data transfer request issuing unit 708 checks the update flag 202 at a falling timing of the vertical synchronous signal, which is a start of the next frame, as well as since the graphics transfer is ON and the moving image transfer is OFF, the data transfer request issuing unit 708 request the transfer of only the graphics table data in the next frame.

Therefore, in the next frame, no decoded image (moving image) data are transferred from the data memory 702 to the video processing unit 701 but only the graphics table data are transferred.

The transferred graphics table data are converted into the display graphics image data in the video processing unit 701, and successively stored in the graphics line buffer 703.

The graphics line buffer 703 transfers the stored data to the graphics frame memory 705 all at once in the blanking period of the next horizontal synchronous signal.

Then, in the effective period except for the blanking period of the horizontal synchronous signal, the data are successively read out from the moving image frame memory 704 and the graphics frame memory 705, and output in accordance with the display timing of the LCD, via a selection circuit for composition of the image data. At this time, since the moving image transfer is OFF, the operation clocks of the moving image processing system in the video processing unit 701 and the moving image line buffer 702 are stopped by the moving image processing system clock stop control unit 801 in the frame rate register 707.

In the image output device according to the fourth embodiment, the data transfer request is issued in a fixed cycle, to update the display image data which are stored in the moving image frame memory 704 and the display graphics frame memory 705. Then, in cases where images which are to be updated immediately such as graphic image data appear, when the processor unit 101 sets the update flag in the frame rate register 707, only when the moving image register or the graphics register is effective, the corresponding data transfer request is issued. Therefore, the delay before the data display from the user's operation can be reduced, thereby providing no unnatural video, as well as the operation clocks of the moving image processing system and the graphics processing system can be separately controlled without performing the needless transfer of moving image data. Accordingly, the power consumption can be reduced when no data transfer is executed.

Further, the moving image line buffer 702 and the graphics line buffer 703 are provided in the previous stage of the moving image frame memory 704 and the graphics frame memory 705, respectively. Therefore, since the display moving image data and the display graphics image data are separately stored, disturbance such as disappearances of video do not occur. Further, the data which are stored in the moving image line buffer 702 and the graphics line buffer 703 are transferred to the moving image frame memory 704 and the graphics frame memory 705 of the later stage in the blanking period of the horizontal synchronous signal among the signals for use in image output to the image display device, and one line of image data which are obtained by composing the output data from the moving image frame memory 704 and the graphics frame memory 705 are output to the image display device of the later stage in the period except for the blanking period of the horizontal synchronous signal. Therefore, the control on the timing of writing data into the frame memory can be easily executed, as well as the composition and display of images can be performed by one frame memory. Besides, the frame delay before displaying the transferred data can be omitted.

[Embodiment 5]

Hereinafter, an image output device according to the fifth embodiment of the present invention is described with reference to FIGS. 9 and 10.

Figure 9:
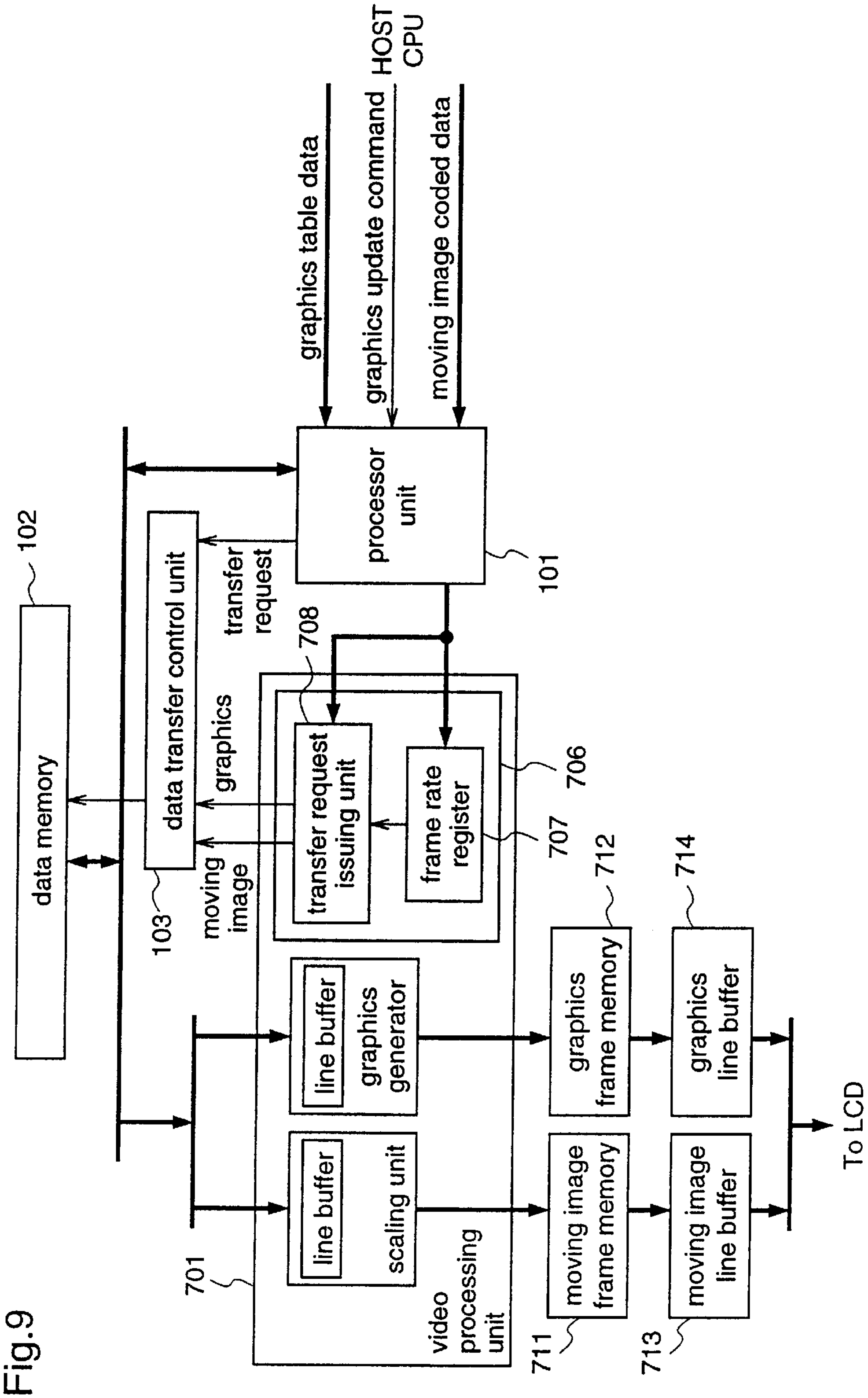
FIG. 9 is a block diagram illustrating a structure of an image output device according to a fifth embodiment of the present invention.

FIG. 9 is a block diagram illustrating a structure of the image output device of the fifth embodiment. In FIG. 9, the same reference numerals as those in FIG. 8 denotes the same or corresponding elements. A moving image frame memory 711 temporarily contains one frame of the display moving image data, and outputs the stored display moving image data in units of one line. A graphics frame memory 712 temporarily contains one frame of the display graphics image data, and outputs the stored display graphics image data in units of one line. A moving image line buffer 713 temporarily contains the output data from the moving image frame memory 711. A graphics line buffer 714 temporarily contains the output data from the graphics frame memory 712.

Next, the operation of the image output device of the fifth embodiment is described.

The processor unit 101 carries out a process for decoding images using the data memory 102, and stores decoded images in the data memory 102. In addition, the graphics data which are transferred from the host CPU are also stored in the data memory 102.

The processor unit 101 sets the frame rate register 707 at a value indicating 15 Hz which is a decoded image rate. "15 Hz" means one transfer every four frames with reference to the vertical synchronous signal of the LCD, as shown in FIG. 4. That is, the data transfer is effective once every four frames. Therefore, the frame rate register 201 is set at 3. Further, it is set in the data transfer request issuing unit 708 that the transfer is switched to ON only in the case of data which are to be transferred. Here, normally assuming only displays of decoded images (moving images), it is set that the moving image transfer is ON and the graphics transfer is OFF.

In the case of frames whose transfers are effective, the data transfer request issuing unit 708 issues the data transfer request in accordance with the start timing of the horizontal synchronous signal, from a timing immediately preceding the timing when the vertical synchronous signal of the LCD becomes effective as shown in FIG. 4. At this time, the transfer request is issued only for the moving image transfer, and the graphics transfer is not carried out.

One line of the moving image data which are transferred as described above are subjected to the scaling process in the video processing unit 701, in the effective period except for the blanking period of the horizontal synchronous signal, enlarged from the QCIF (176×144) size into the CIF (352×288) size, and the processed moving image data are successively stored in the moving image frame memory 711 as the display moving image data. In the moving image frame memory 711, one frame (288 lines) of the moving image data are stored. Then, the stored moving image data are transferred to the moving image line buffer 713 all at once, in units of one line, in the blanking period of the next horizontal synchronous signal.

From the moving image line buffer 713, the stored moving image data are output to the external LCD in accordance with the synchronous signal and the pixel output timing in the effective period except for the blanking period of the horizontal synchronous signal.

For example, luminance data are read from the moving image frame memory 711 to the moving image line buffer 713 for each line, and output to the LCD. However, in the case of color difference data, one line of the data of only even lines are read from the moving image frame memory 711, and transferred to the moving image line buffer 713, and as for odd lines, the color difference data of the immediately preceding line which are stored in the moving image line buffer 713 are output. Thus, the images of 4:2:0 format which are stored in the moving image frame memory 711 are converted into 4:2:2 format, and output to the LCD.

The writing into the moving image frame memory 711 is not carried out in cycles other than the 15-Hz transfer cycle, and the image data are repeatedly output from the moving image frame memory 711 to the LCD through the moving image line buffer 713.

Further, the operation clock of the graphics transfer system of the video processing unit 701, which has a transfer cycle other than the 15-Hz transfer cycle and is switched to OFF by the data transfer request issuing unit 708, is stopped by the graphics clock stop control unit in FIG. 10.

Next, a description is given of a case where the graphics update command is issued together with the graphics table data from the host CPU.

The processor unit 101 sets the graphics transfer ON in the data transfer request issuing unit 708 in the video processing unit 701, and sets the update flag 202 of the frame rate register 707 at 1. At this time, when it is not required to update the display moving image data and only the display graphics image data are to be changed, the OFF of the moving image transfer is set by the data transfer request issuing unit 708.

Therefore, in the next frame, no moving image data are transferred from the data memory 102 to the video processing unit 701, and only the graphics table data are transferred.

The transferred graphics data are converted into display graphics image data in the video processing unit 701, and successively stored in the graphics frame memory 712.

One line of the data are read from the moving image frame memory 711 and the graphics frame memory 712, respectively, in the blanking period of the next horizontal synchronous signal, and transferred all at once to the moving image line buffer 713 and the graphics line buffer 714, respectively.

When the formats of the moving image data and the graphics image data are the same (for example, both are Y, Cb, Cr format, or RGB format), data are successively read from the moving image line buffer 713 and the graphics line buffer 714 in the effective period of the horizontal synchronous signal, and output in accordance with the display timing of the LCD through the selection circuit for the composition.

On the other hand, when their formats are different from each other, the image data are output not through the selection circuit but separately to the processing circuits of the later stage. Since the moving image transfer is OFF at this time, the operation clock of the moving image processing system in the video processing unit 701 is stopped by the moving image processing system clock stop unit 801 in the frame rate register unit 707.

In the image output device according to the fifth embodiment, the data transfer request is issued in a fixed cycle, thereby updating the display image data which are stored in the moving image frame memory 704 and the graphics frame memory 705. In cases where images which are to be immediately updated such as graphics image data appear, when the processor unit 101 sets the update flag in the frame rate register 707, only when the moving image register or the graphics register is effective, the corresponding data transfer request is issued. Therefore, the delay before the data display from the user's operation can be reduced, and no unnatural video is provided, as well as the operation clocks of the moving image processing system and the graphics processing system can be separately controlled without transferring needless moving image data, whereby the consumed power can be reduced when no data transfer is executed.

In addition, the moving image line buffer 713 and the graphics line buffer 714 are provided in the later stage of the moving image frame memory 711 and the graphics frame memory 712, respectively, whereby the control on the timing of reading from the frame memories and the output control in accordance with the display timing of the LCD can be easily executed. Since the display moving image data and the display graphics image data are separately stored, the disturbance such as disappearance of video do not occur, and when the same data as those of the previous line are repeatedly output, it is not required to access the frame memories 711 and 712 each time, whereby the power consumed in the frame memories 711 and 712 can be reduced.

Further, one line of the display image data are written into the frame memories 711 and 712 in the effective period of the horizontal synchronous signal of the previous line, and one line of the data are transferred all at once to the line buffers 713 and 714 in the blanking period of the horizontal synchronous signal, respectively, and the image data are output to the LCD in the effective period of the horizontal synchronous signal, whereby the frame delay before displaying the transferred data can be reduced.

[Embodiment 6]

Hereinafter, an image output device according to the sixth embodiment of the present invention is described with reference to FIGS. 4 and 11.

Figure 11:
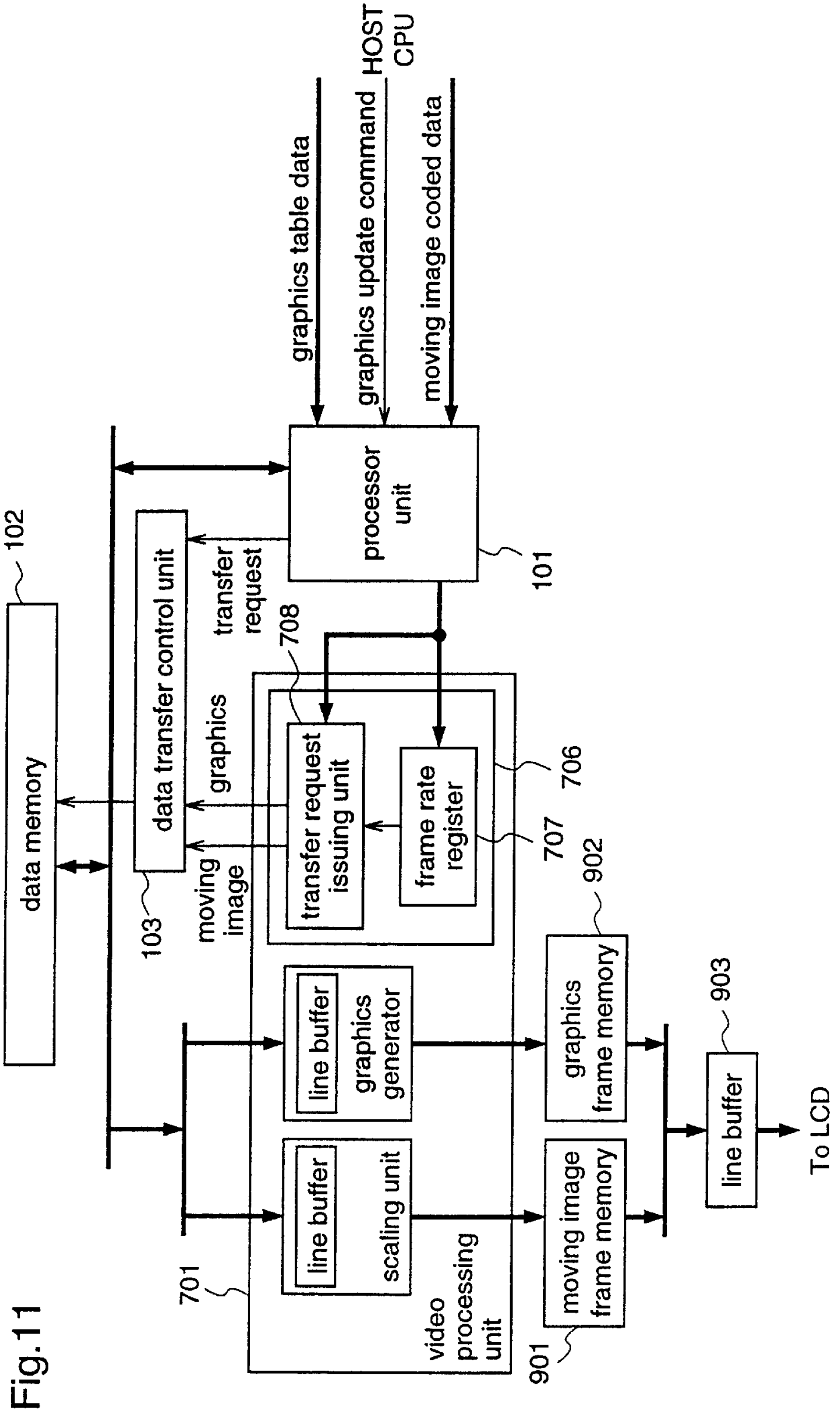
FIG. 11 is a block diagram illustrating a structure of an image output device according to a sixth embodiment of the present invention.

FIG. 11 is a block diagram illustrating the image output device of the sixth embodiment. In FIG. 11, the same reference numerals as those in FIG. 8 denote the same or corresponding elements.

A moving image frame memory 901 contains one frame (288 lines) of display moving image data of one line, in the effective period except for the blanking period of the horizontal synchronous signal. A graphics frame memory 902 contains one frame (288 lines) of display graphics image data of one line, in the effective period except for the blanking period of the horizontal synchronous signal. A line buffer 903 composes the output data from the moving image frame memory 901 and the graphics frame memory 902, and contains one line of the data. The data are read from the respective frame memories in the blanking period of the horizontal synchronous signal, and stored in the line buffer 903 through a selection circuit for the composition.

In addition, the data are output from the line buffer 903 in accordance with the synchronous signal of the LCD and the pixel display timing in the effective period except for the blanking period of the horizontal synchronous signal.

Since the sixth embodiment is almost the same as the fourth embodiment, the common elements are not described here.

Next, the operation of the image output device of the sixth embodiment is described.

As described in the fourth embodiment, the moving image data and the graphics table data which are transferred from the data memory 102 are processed by the video processing unit 701, respectively. The processor unit 101 sets the frame rate register 707 at a value indicating 15 Hz which is the decoded image rate. Further, the data transfer request issuing unit 708 is set to switch the transfer to ON only in the case of data which are to be transferred. Here, normally assuming only displays of the moving images, it is set that the moving image transfer is ON and the graphics transfer is OFF.

In the case of frames whose transfers are effective, the data transfer request issuing unit 708 issues the data transfer request in accordance with the timing of the horizontal synchronous signal, from a timing immediately preceding the timing when the vertical synchronous signal of the LCD becomes effective, as shown in FIG. 4. At this time, the data transfer request is issued only for the moving image data, and the transfer of the graphics data is not carried out.

One line of the moving image data which are transferred as described above are subjected to the scaling process in the video processing unit 701 in the effective period except for the blanking period of the horizontal synchronous signal, and enlarged from the QCIF (176×144) size to the CIF (352×288) size. The processed moving image data are successively stored in the moving image frame memory 901 as the display moving image data. Then, one frame (288 lines) of the display moving image data which are stored in the moving image frame memory 901 are transferred all at once to the line buffer 903 in the blanking period of the next horizontal synchronous signal. The data are output from the line buffer 903 to the external LCD in the effective period except for the blanking period of the horizontal synchronous signal in accordance with the synchronous signal and the pixel output timing.

Further, the writing into the moving image frame memory 901 is not carried out in cycles other than 15-Hz transfer cycle, and the image data are repeatedly output from the moving image frame memory 901 to the LCD through the line buffer 903.

Like in the fourth embodiment, the operation clock of the video processing unit 701 is stopped by the graphics processing system clock stop control unit 802.

Next, a description is given of a case where the graphics update command is issued in conjunction with the graphics table data from the host CPU.

The processor unit 101 sets the graphics transfer ON in the data transfer request issuing unit 708, and sets the update flag 202 of the frame rate register 707 at 1. At this time, when it is not required to update the display moving image data and only the display graphics image data to be changed, the moving image transfer is switched OFF by the data transfer request issuing unit 708.

Therefore, in the next frame, the moving image data are not transferred from the data memory 102 to the video processing unit 704 but only the graphics table data are transferred. The transferred graphics table data are converted into the display graphics image data in the video processing unit 701, and successively stored in the graphics frame memory 902. Since the display moving image data and the display graphics image data are separately stored, the disturbance such as disappearance of video do not occurs.

One line of the display image data are read from the moving image frame memory 901 and the graphic frame memory 902 in the blanking period of the next horizontal synchronous signal, respectively, and transferred to the line buffer 903 via the selection circuit for composing the data. Then, in the effective period except for the blanking period of the horizontal synchronous signal, the data are successively read from the line buffer 903, and output in accordance with the display timing of the LCD. Since the moving image transfer is OFF during this time, the operation clock of the moving image processing system in the video processing unit 701 is stopped by the moving image processing system clock stop control unit 801 in the frame rate register 707.

In the image output device according to the sixth embodiment, the data transfer request is issued in a fixed cycle, to update the display image data which are stored in the moving image frame memory 704 and the graphics frame memory 705. Then, in cases where images which are to be updated immediately such as graphics image data appear, when the processor unit 101 sets the update flag in the frame rate register 707, only when the moving image register or the graphics register is effective, the corresponding data transfer request is issued. Therefore, the delay before the data display from the user's operation can be reduced, to provide no unnatural video, as well as the operation clocks of the moving image processing system and the graphics processing system can be separately controlled without performing the needless transfer of moving image data, whereby the power consumption can be reduced when no data transfer is carried out.

In addition, one line buffer 903 is provided in the later stage of the moving image frame memory 901 and the graphics frame memory 902, whereby the display image data are written into the moving image frame memory 901 and the graphics frame memory 902 in periods except for the blanking period of the horizontal synchronous signal among signals for use in image output to the image display device, and one line of the respective output data of the moving image frame memory 901 and the graphics frame memory 902 are composed and transferred to the line buffer 903 in the blanking period of the horizontal synchronous signal, and the image data are output from the line buffer 903 to the LCD of the later stage in the period except for the blanking period of the horizontal synchronous signal. Therefore, the frame delay before the display of the transferred image data can be dispensed with, and the timing of reading from the frame memory and the timing of display to the image display device can be easily controlled, thereby minimizing the operation times of the frame memories 901 and 902, to reduce the consumed power.

[Embodiment 7]

Hereinafter, an image output device according to the seventh embodiment of the present invention is described with reference to FIGS. 4 and 12.

Figure 12:
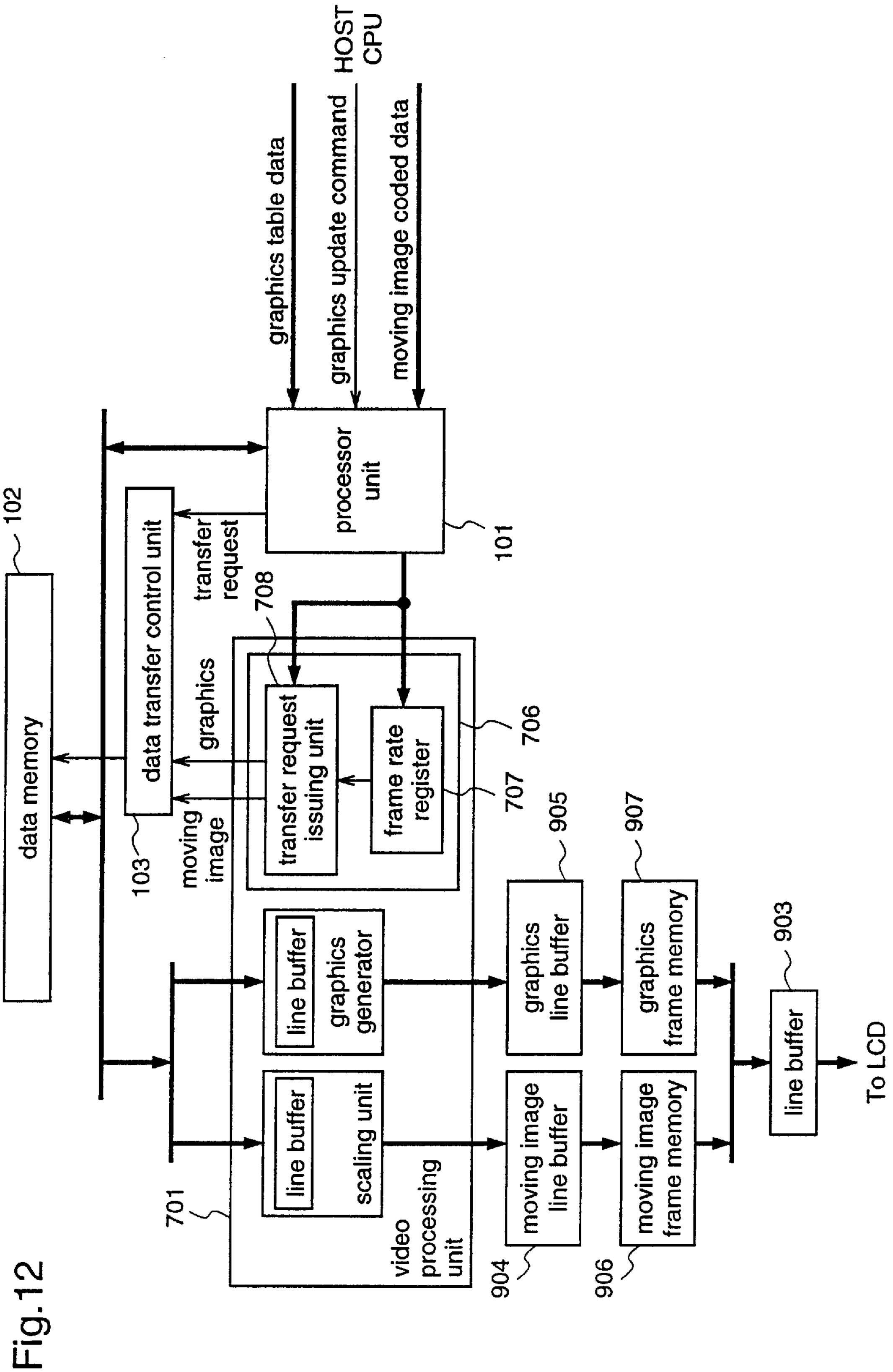
FIG. 12 is a block diagram illustrating a structure of an image output device according to a seventh embodiment of the present invention.

FIG. 12 is a block diagram illustrating a structure of the image output device of the seventh embodiment. In FIG. 12, the same reference numerals as those in FIG. 11 denote the same or corresponding elements.

A moving image line buffer 904 temporarily contains one line of display moving image data. A graphics line buffer 905 temporarily contains one line of display graphics image data. A moving image frame memory 906 temporarily contains one frame of the output data from the moving image line buffer 904. A graphics frame memory 907 temporarily contains one frame of the output data from the graphics line buffer 905.

Next, the operation of the image output device of the seventh embodiment is described.

The processor unit 101 carries out a process for decoding images using the data memory 102, and stores decoded images in the data memory 102. In addition, graphics table data which are transferred from the host CPU are also stored in the data memory 102.

The processor unit 101 sets the frame rate register 707 at a value indicating 15 Hz which is a decoded image rate. "15 Hz" means one transfer every four frames with reference to the vertical synchronous signal of the LCD, as shown in FIG. 4. That is, the data transfer is effective once every four frames. Therefore, the frame rate register 201 is set at 3. Further, it is set in the data transfer request issuing unit 708 that the transfer is switched to ON only in the case of data which are to be transferred. Here, normally assuming displays of only decoded images (moving images), it is set that the moving image transfer is ON and the graphics transfer is OFF.

Further, in the case of frames whose transfers are effective, the data transfer request issuing unit 708 issues the data transfer request from a timing immediately preceding the timing when the vertical synchronous signal of the LCD becomes effective, in accordance with the start timing of the horizontal synchronous signal, as shown in FIG. 4. At this time, the transfer request is issued only for the moving image data, and the transfer of the graphics data is not carried out.

One line of the moving image data which are transferred as described above are subjected to the scaling process in the video processing unit 701 in the effective period except for the blanking period of the horizontal synchronous signal, and enlarged from the QCIF (176×144) size into the CIF (352×288) size. The processed moving image data are successively stored in the moving image line buffer 904 as the display moving image data.

The one line of the display moving image data which have been stored in the moving image line buffer 904 are stored in the moving image frame memory 906 all at once in the first half of the blanking period of the horizontal synchronous signal.

Then, in the latter half of the blanking period of the horizontal synchronous signal, the display moving image data which have been stored in the moving image frame memory 906 are transferred to the line buffer 903 of the later stage all at once.

The data are output from the line buffer 903 to the external LCD in the effective period except for the blanking period of the horizontal synchronous signal, in accordance with the synchronous signal and the pixel output timing.

Here, the writing into the moving image frame memory 906 is not carried out in cycles other than 15-Hz transfer cycle, and the display image data which have been stored in the moving image frame memory 906 are repeatedly output to the LCD through the line buffer 903.

In addition, in the case of transfer cycle other than the 15-Hz transfer cycle, the operation clocks of the video processing unit 701 and line buffer 903 of the graphics transfer system, in which the transfer is switched OFF by the data transfer request issuing unit 708, are stopped by the graphics clock stop control unit 802.

Next, a description is given of a case where the graphics update command is issued in conjunction with the graphics table data from the host CPU.

The processor unit 101 sets the graphics transfer ON in the data transfer request issuing unit 708, and sets the update flag 202 of the frame rate register 707 at 1. At this time, when it is not required to update the display moving image data and only the display graphics image data are to be changed, the moving transfer is switched OFF by the data transfer request issuing unit 708. At this time, the graphic image transfer remains ON.

The data transfer request issuing unit 708 checks the update flag at a falling timing of the vertical synchronous signal, which is the start of the next frame, and because the graphics transfer is ON and the moving image transfer is ON, it requests the transfer of both of the moving image data and the graphics table data in the next frame. Therefore, in the next frame, the moving image data and the graphics data are transferred from the data memory 102 to the video processing unit 701.

One line of the moving image data which are transferred as described above are subjected to the scaling process in the video processing unit 701 in the effective period except for the blanking period of the horizontal synchronous signal, enlarged from the QCIF (176×144) into the CIF (352×288) size, and successively stored in the moving image line buffer 904 as the display moving image data.

Further, the graphics table data are converted into display graphics image data in the video processing unit 701, and successively stored in the graphics line buffer 905.

The data are transferred from the moving image line buffer 904 and the graphics line buffer 905 to the moving image frame memory 906 and the graphics frame memory 907 all at once in the first half of the blanking period of the horizontal synchronous signal, respectively. At this time, since the display moving image data and the display graphics image data are separately stored, the disturbance such as disappearance of video do not occur.

Further, in the latter half of the blanking period of the horizontal synchronous signal, the display image data which are obtained by composing the display moving image data and the display graphics image data are stored from the moving image frame memory 906 and the graphics frame memory 907 into the line buffer 903.

In the effective period of the horizontal synchronous signal, the composed display image data are successively output from the line buffer 903 in units of one line, in accordance with the display timing of the LCD.

In the image output device according to the seventh embodiment, the data transfer request is issued in a fixed cycle, to update the display image data which are stored in the moving image frame memory 704 and the graphics frame memory 705. Then, in cases where images which are to be updated immediately such as graphics image data appear, when the processor unit 101 sets the update flag in the frame rate register 707, only when the moving image register or the graphics register is effective, the corresponding data transfer request is issued. Therefore, the delay before the data display from the user's operation can be reduced, thereby providing no unnatural video, as well as the operation clock of the moving image processing system and the graphics processing system can be controlled separately without performing the needless transfer of moving image data. Therefore, when no data transfer is executed, the power consumption is reduced.

In addition, the moving image line buffer 904 and the graphics line buffer 905 are provided in the previous stage of the moving image frame memory 906 and the graphics frame memory 907, respectively, whereby the control on the timing of writing into the frame memories 906 and 907 can be facilitated, and the composition and display of images can be realized by one frame memory. Further, one line buffer 903 is provided also in the latter stage, and the display moving image data and the display graphics image data are composed and stored in the line buffer 903 in the blanking period of the horizontal synchronous signal, whereby the respective operation times of the frame memories 906 and 907 can be minimized and the power consumption can be reduced.

Further, one line of the display image data are stored in the frame memories 906 and 907 all at once in the first half of the blanking period of the horizontal synchronous signal, and the data are transferred to the line buffer in the latter half of the blanking period of the horizontal synchronous signal, whereby the frame delay before the display of the transferred data can be reduced.

In addition, in this seventh embodiment, the display image data are written in the frame memory in the first half of the blanking period of the horizontal synchronous signal, and the data transfer from the frame memory to the line buffer is carried out in the latter half of the blanking period of the horizontal synchronous signal. However, on the contrary, when the data transfer to the line buffer is carried out in the first half of the blanking period of the horizontal synchronous signal, then the data writing into the frame memory is carried out in the latter half of the blanking period of the horizontal synchronous signal, the display image data are input to the frame memory at timing of the immediately preceding line and, at timing of the next line, display image data of the line which is immediately subsequent to the input display image data are output from the frame memory, the same effects as those of the seventh embodiment can be obtained.

[Embodiment 8]

Hereinafter, an image output device according to the eighth embodiment of the present invention is described with reference to FIG. 13.

Figure 13:
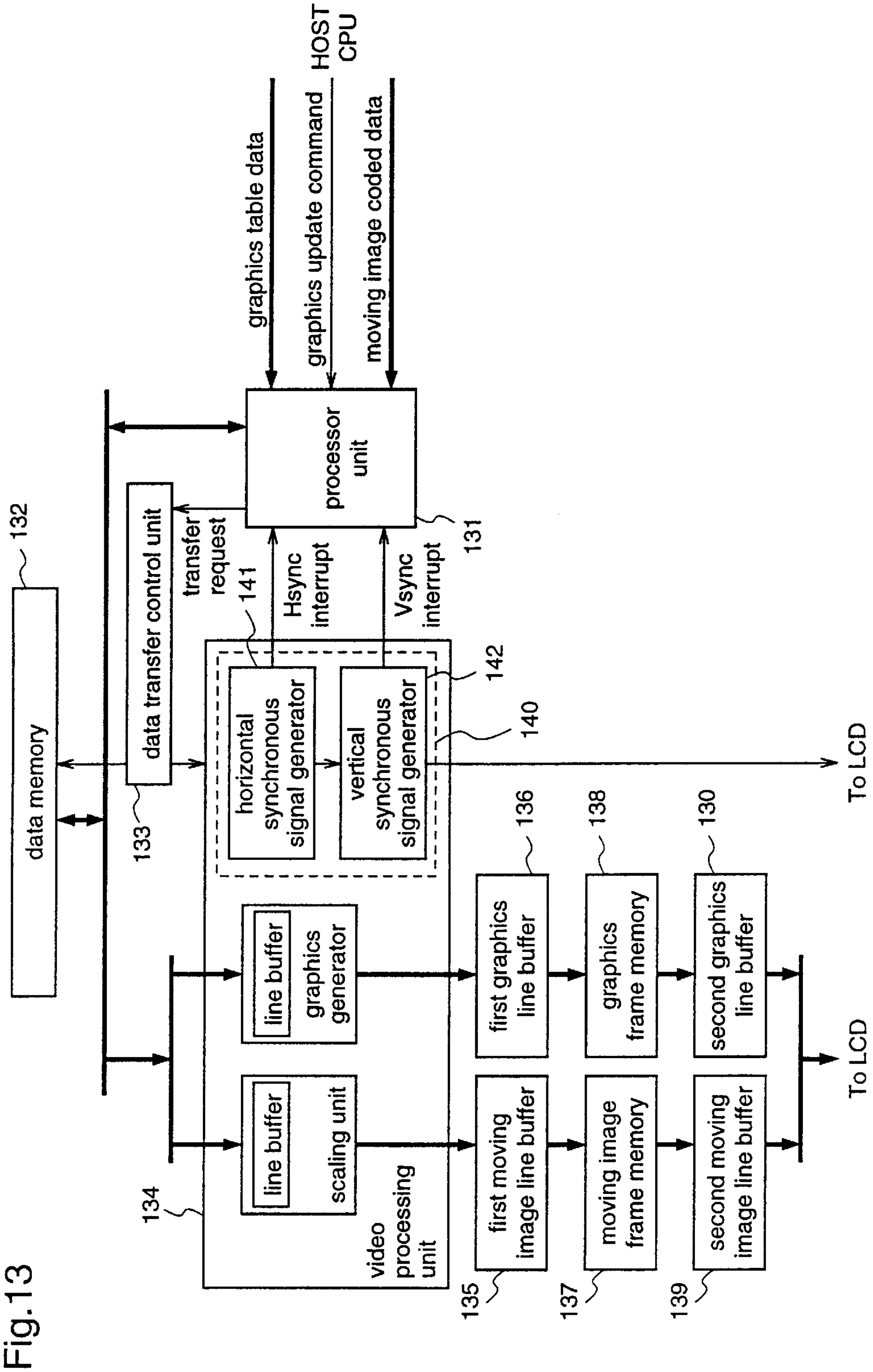
FIG. 13 is a block diagram illustrating a structure of an image output device according to an eighth embodiment of the present invention.

FIG. 13 is a block diagram illustrating a structure of the image output device of the eighth embodiment. In FIG. 13, a processor unit 131 controls the device in its entirety. A data memory 132 contains image data such as moving image data and graphic table data. A data transfer control unit 133 controls data transfer between the data memory 132 and a video processing unit 134. The video processing unit 134 carries out an image processing such as a scaling process and a graphics generation process, for the image data which have been transferred from the data memory 132, to generate display image data such as display moving image data and display graphics image data.

A first moving image line buffer 135 temporarily contains one line of moving image data. A first graphics line buffer 136 temporarily contains one line of graphics image data. A moving image frame memory 137 temporarily contains the output data of the first moving image line buffer 135. A graphics frame memory 138 temporarily contains the output data of the first graphics line buffer 136. A second moving image line buffer 139 temporarily contains the output data of the moving image frame memory 137. A second graphics line buffer 130 temporarily contains the output data of the graphics frame memory 138. A fixed cycle interruption generation unit 140 outputs an interrupt signal to the processor unit 131 at regular intervals in accordance with signals for use in image output to the image display device, and comprises a horizontal synchronous signal generator 141 for generating a Hsync interrupt signal and a vertical synchronous signal generator 142 for generating a Vsync interrupt signal.

Next, the operation of the so-constructed image output device is described.

The processor unit 131 decodes moving image coded data which are transferred from the host CPU, using the data memory 132, and stores the moving image data in the data memory 132. The graphics table data which are transferred from the host CPU are also stored in the data memory 132.

The horizontal synchronous signal generator 141 and the vertical synchronous signal generator 142 generate a Hsync interrupt signal and a Vsync interrupt signal, respectively, to the processor unit 131, in timing of the synchronous signal.

In accordance with the input of the Vsync interrupt signal, the processor unit 131 resets a value of the number of generations of the Hsync interrupt signal (line count), to reset a generation interval of the data transfer request. Hereinafter, each time the Hsync interrupt signal is generated, the number of generations is counted up.

Figure 14:
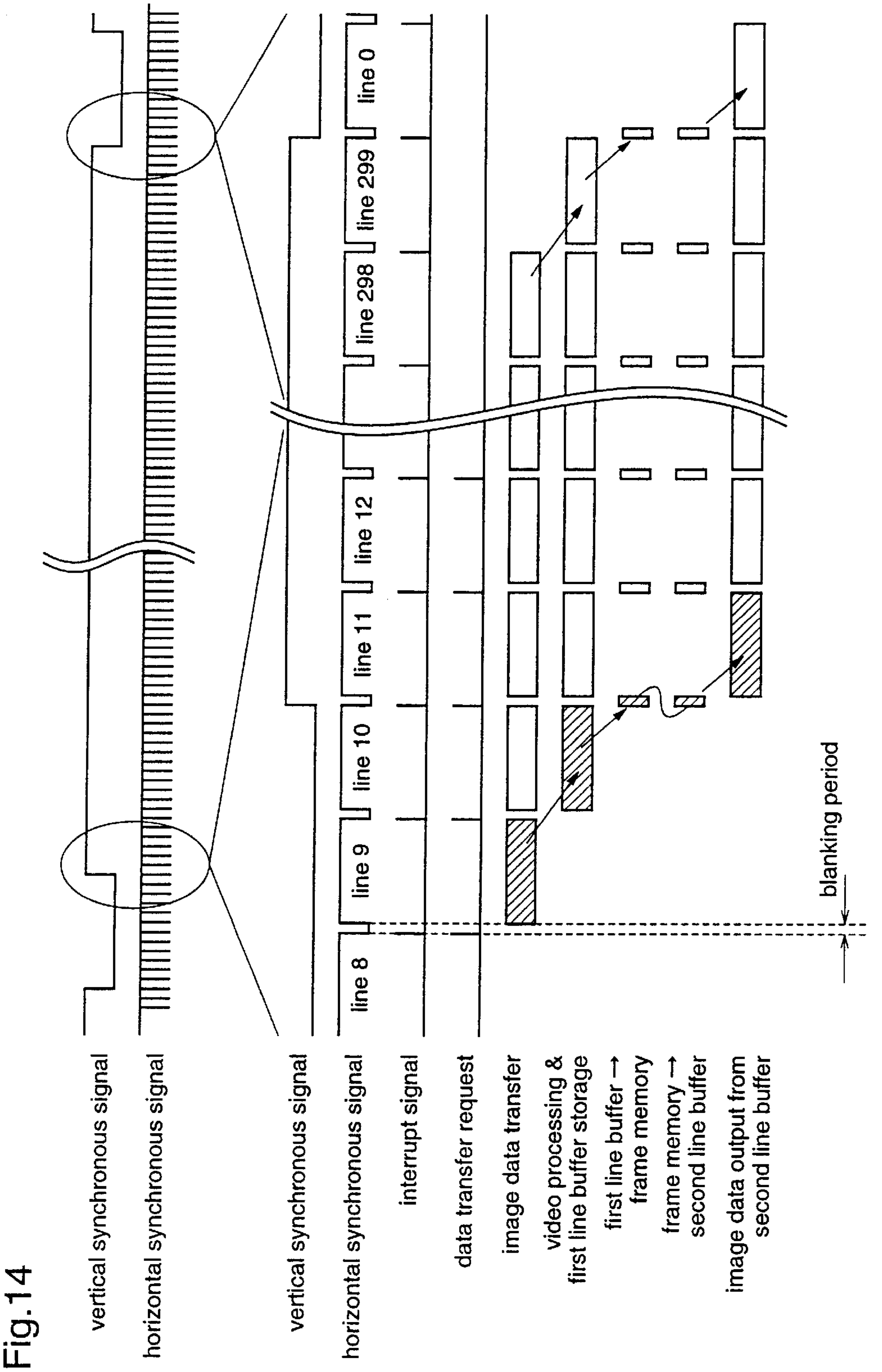
FIG. 14 is a diagram showing a relationship between a horizontal synchronous signal of a LCD and a data transfer timing.
Figure 15:
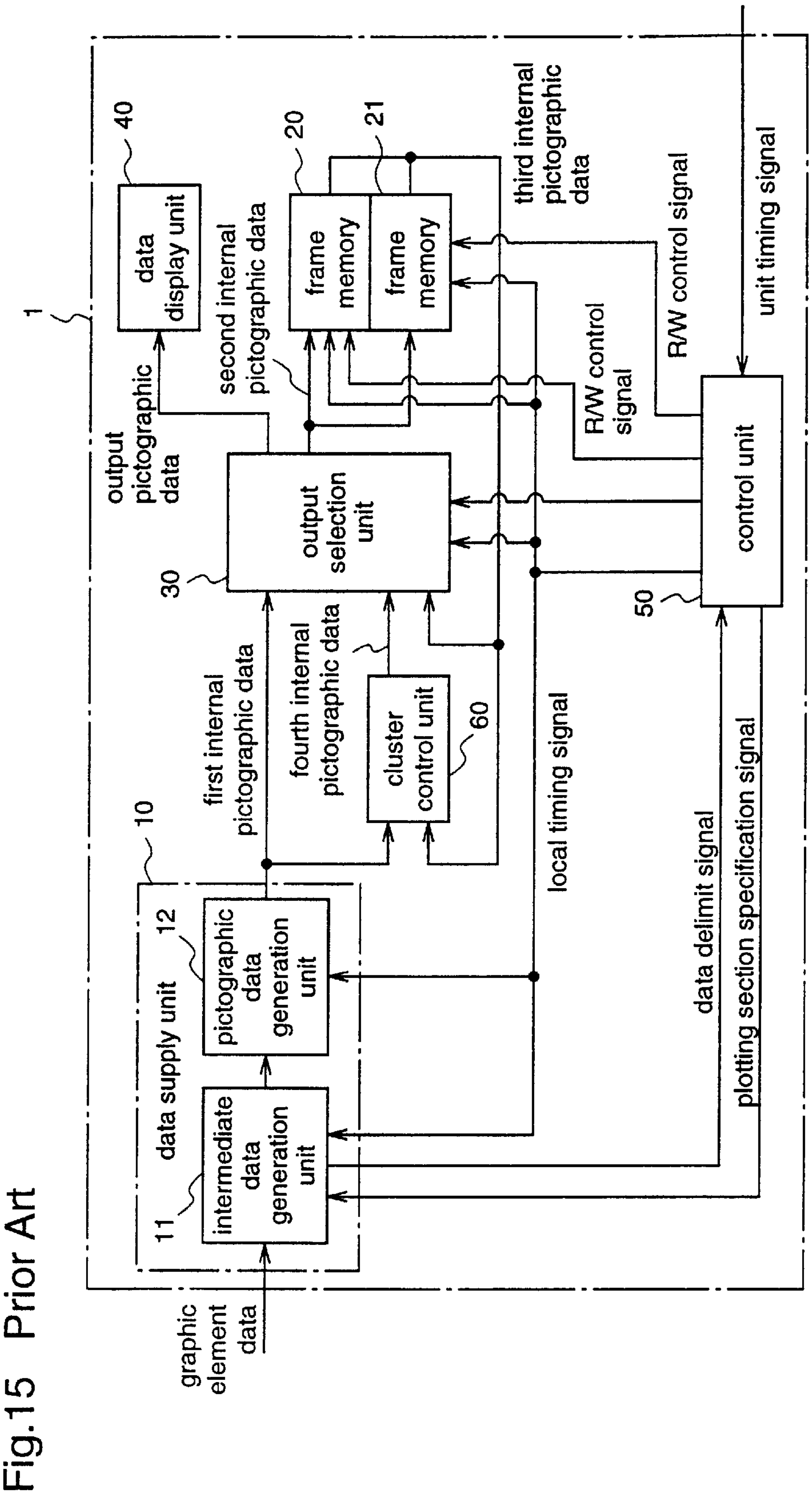
Fig.15 Prior Art
FIG. 15 is a diagram illustrating a structure of a prior art electronic plotting device.
Figure 16:
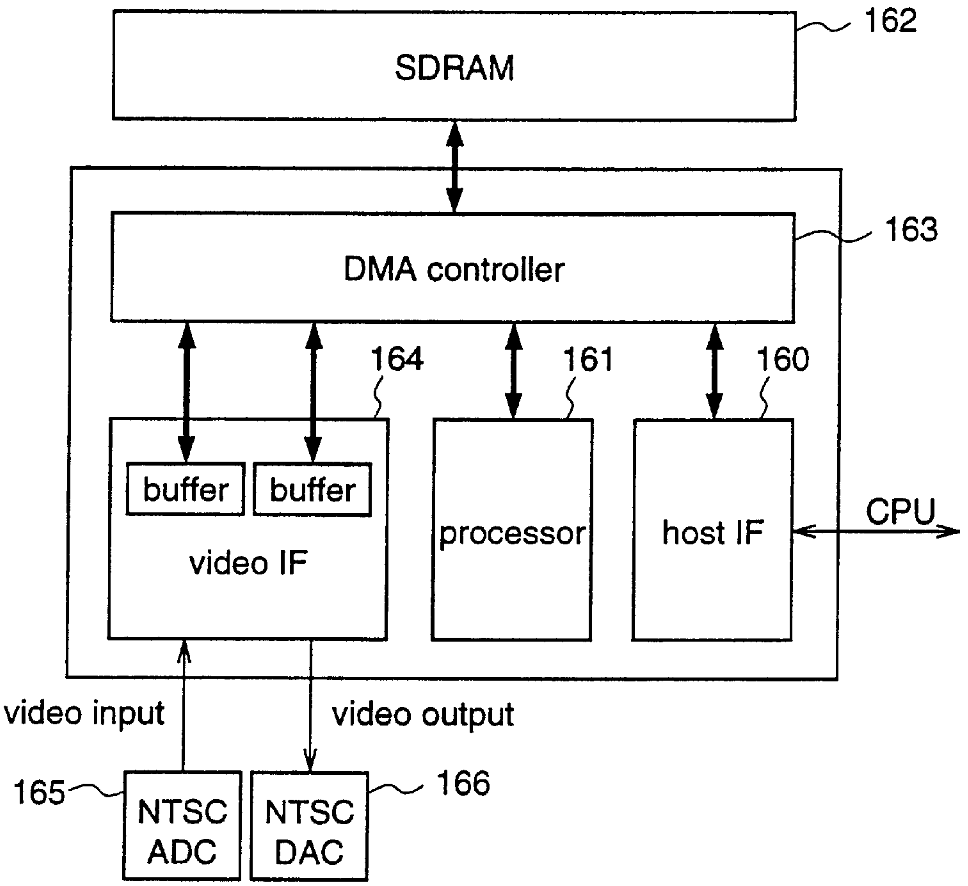
Fig.16 Prior Art
FIG. 16 is a diagram illustrating an example of a prior art image output device.
Figure 17:
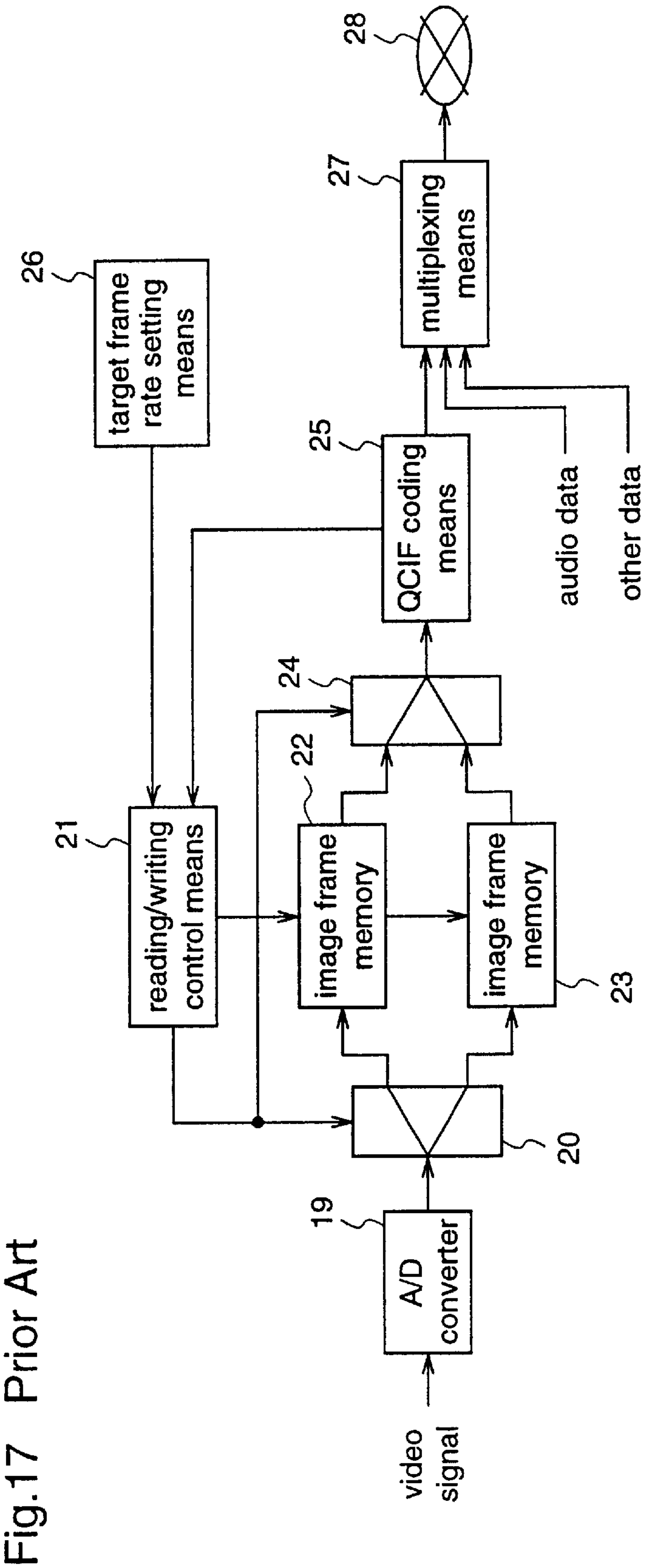
Fig.17 Prior Art
FIG. 17 is a diagram illustrating a structure of a prior art image transmitter.
Figure 18:
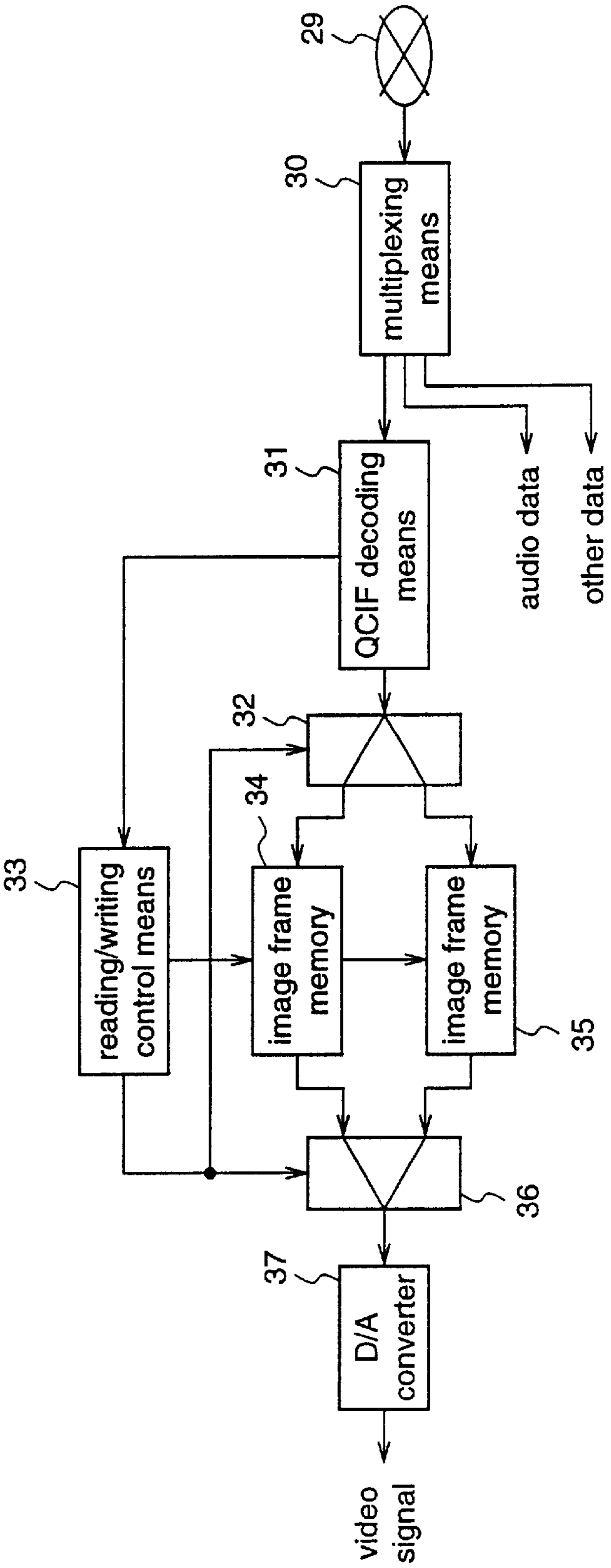
Fig.18 Prior Art
FIG. 18 is a diagram illustrating a structure of a prior art image receiver.

Then, as shown in FIG. 14, when the Hsync interrupt signal of line 8 is input, the processor unit 131 issues the data transfer request to the data transfer control unit 133. Here, when only the moving image data are to be displayed, the data transfer request is issued only for the moving image data, and when only the graphics data are to be displayed, the data transfer request requests is issued only for the graphics table data. When both of the data are required to compose and output these data in the last stage, the data transfer request for transferring the moving image data and the graphics table data is issued.

The processor unit 131 continues to issue the data transfer request until the Hsync interrupt signal of line 297 is input, and when the Hsync interrupt signal of line 298 is input, the processor unit 131 does not issues the data transfer request. When the Vsync interrupt signal is input again, the line count is reset, and when the decoding process for the moving image coded data has been finished or the graphics data are to be updated in the next frame period, the number of generations of the Hsync interrupt signal is counted up again, and the data transfer request is issued. However, when no image data are transferred in the next frame period (when there is no moving image data, or when there is no graphics data to be updated), the counting-up of the number of generations of the Hsync interrupt signal is not carried out, and the data transfer request is issued neither.

The transferred moving image data and graphics table data are subjected to the image processing such as the scaling, graphics generation, noise elimination, and image format conversion (RGB conversion, 4:2:2 conversion) by the video processing unit 134 in the next line, as required, and written into the first moving image line buffer 135 and the first graphics line buffer 136 as required, as the display moving image data and the display graphics image data.

Then, the data are burst-transferred to the moving image frame memory 137 and the graphics frame memory 138 in the first half of the blanking period of the horizontal synchronous signal of the next line.

Subsequently, the data from the moving image frame memory 137 and the graphics frame memory 138 are transferred to the second moving image line buffer 139 and the second graphics line buffer 130 in the latter half of the blanking period of the same horizontal synchronous signal, respectively. After the end of the blanking period, the display moving image data and the display graphics image data are composed and output to the LCD. Thus, the delay before the image display can be reduced.

Further, as for frames for which the processor unit 131 does not issue the image data transfer request, the display image data which have been stored in the moving image frame memory 137 and the graphics frame memory 138 in the previous frame period are output to the LCD via the second line buffer 139 and the second graphics line buffer 130, respectively.

In the image output device according to the eighth embodiment, the processor unit 131 controls the transfer of the image data from the data memory 132 to the video processing unit 134, using the interrupt signal of the synchronous signal which is periodically generated from the fixed cycle interruption generation unit 140. Therefore, the processor unit 131 can control the data transfer collectively, as well as program the frame rate freely, whereby the flexibility in the update pattern is increased. Further, since the updating of image frames is controlled by a program, the image frames can be updated even when the design of the hardware has been completed, whereby the facility of designing is increased, and the flexibility is also improved.

Further, the first moving image line buffer 135 and the first graphics line buffer 136 are provided in the previous stage of the moving image frame memory 137 and the graphics frame memory 138, and the second moving image line buffer 139 and the second graphics line buffer 130 are provided in the latter stage, respectively, whereby the image data which are stored in the frame memories 137 and 138 can be displayed immediately. Therefore, the image display having a reduced delay can be realized, as well as data of the next frame can be stored.

Since a large capacity frame memory works only at the input/output of data into/from the first or second line buffer in the blanking period, the power consumption can be reduced by stopping the operation by clock stopping or the like. When the image data transfer does not occur (when the video processing unit does not work), the first line buffer is stopped, and the large capacity frame memory is required to operate only in the blanking period of the horizontal synchronous signal when the transfer to the second line buffer is performed, so that it is sufficient that only the small capacity second line buffer works at the image data output time. Accordingly, the lower power consumption can be realized by stopping the clocks of the line buffer and the frame memory.

In this eighth embodiment, when an image display device such as a LCD comprising a frame memory is used, the output from the video processing unit 134 or the outputs from the first line buffers 135 and 136 can be directly input to the image display device, whereby more effects can be obtained.

In addition, in this eighth embodiment, the display image data are written in the frame memory in the first half of the blanking period of the horizontal synchronous signal, and the data transfer from the frame memory to the line buffer is carried out in the latter half of the blanking period of the horizontal synchronous signal. However, on the contrary, when the data transfer to the line buffer is carried out in the first half of the blanking period of the horizontal synchronous signal, then the data writing into the frame memory is carried out in the latter half of the blanking period of the horizontal synchronous signal, the display image data are input to the frame memory at timing of the immediately preceding line and, at timing of the next line, display image data of the line which is immediately subsequent to the input display image data are output from the frame memory, the same effects as those of the eighth embodiment can be obtained.

What is claimed is:

1. An image output device comprising a data memory for containing image data, a video processing unit for carrying out an image processing for the image data to generate display image data, a data transfer control unit for controlling data transfer between the data memory and the video processing unit, an output data storage unit for temporarily containing the display image data and outputting the display image data to an image display unit at regular intervals, and a system control unit for controlling the entire device, said image output device comprising a data transfer request control circuit for issuing a data transfer request to execute the data transfer in units of prescribed data, only when the system control unit provides an update instruction for updating the display image data which are stored in the output data storage unit.

2. The image output device of claim 1 wherein the data transfer request control circuit comprises a data transfer request issuing unit for periodically issuing the data transfer request and a frame rate register for deciding a cycle of issuing the data transfer request, and said data transfer request issuing unit starts the issue of the data transfer request immediately at an issue start judgement timing of the data transfer request, when an update flag is set in the frame rate register by the system control unit, regardless of the issue cycle which has been set in the frame rate register.

3. The image output device of claim 2 wherein the frame rate register comprises a counter for counting the issue start judgement timing of the data transfer request, a most significant bit is a bit which indicates the update flag, and lower bits except for the most significant bit decide the issue cycle, when the update flag is effective, the counter is reset, the update flag is reset to an invalid value at an issue start judgement timing of the next data transfer request, and the counter counts again the issue cycle which has been decided by the lower bits except for the most significant bit.

4. The image output device of claim 3 wherein the frame rate register decides a transfer cycle which indicates a frame in which the data transfer request is to be issued, in a cycle of outputting images to the image display device, and the data transfer request issuing unit comprises a moving image transfer register for deciding whether transfer of moving image data is effective or invalid and a graphics transfer register for deciding whether transfer of graphics data is effective or invalid, and when the system control unit sets the update flag in the frame rate register, issues the data transfer request corresponding to the respective register only when the moving image register or the graphics register is effective.

5. The image output device of claim 4 wherein the data transfer request issuing unit issues the data transfer request for each line at a timing of a horizontal synchronous signal among signals for use in image output to the image display device, in a frame where the data transfer is effective.

6. The image output device of claim 5 wherein when the update flag is set in the frame rate register, the data transfer request issuing unit judges that the update flag is effective at a timing of the next vertical synchronous signal among the signals for use in image output to the image display device, and issues the data transfer request for transferring said frame.

7. The image output device of claim 1 wherein the video processing unit comprises a scaling unit for scaling moving image data which are transferred from the data memory to generate display moving image data, and a graphics generation unit for subjecting graphics data which are transferred from the data memory to graphics generation to generate display graphics image data, and composes the display moving image data and the display graphics image data to be output.

8. The image output device of claim 7 wherein the output data storage unit comprises a line buffer for temporarily containing one line of output data from the video processing unit, and a frame memory for containing one frame of output data from the line buffer.

9. An image output control method for controlling output of image data from the image output device of claim 8 to an image display device, comprising:

storing the display image data in the line buffer in a period except for a blanking period of a horizontal synchronous signal among signals for use in image output to the image display device;

transferring the display image data from the line buffer to the frame memory in the blanking period of the horizontal synchronous signal; and outputting the display image data from the frame memory to the image display device in a period except for the blanking period of the horizontal synchronous signal.

10. The image output device of claim 7 wherein the output data storage unit comprises a frame memory for containing one frame of output data from the video processing unit and successively outputting the stored data in units of one line, and a line buffer for containing output data from the frame memory.

11. An image output control method for controlling output of image data from the image output device of claim 10 to an image display device, comprising:

storing the display image data in the frame memory in a period except for the blanking period of a horizontal synchronous signal among signals for use in image output to the image display device;

transferring the display image data from the frame memory to the line buffer in the blanking period of the horizontal synchronous signal; and outputting the display image data from the line buffer to the image display device in a period except for the blanking period of the horizontal synchronous signal.

12. The image output device of claim 1 wherein the video processing unit comprises a scaling unit for scaling moving image data which are transferred from the data memory to generate display moving image data, and a graphics generation unit for subjecting graphics data which are transferred from the data memory to graphics generation to generate display graphics image data, and outputs the display moving image data and the display graphics image data to the output data storage unit, respectively.

13. The image output device of claim 12 wherein the output data storage unit comprises a moving image line buffer for temporarily containing one line of the display moving image data, a moving image frame memory for temporarily containing one frame of output data from the moving image line buffer, a graphics line buffer for temporarily containing one line of the display graphics image data, and a graphics frame memory for temporarily containing one frame of output data from the graphics line buffer, and composes the data stored in the moving image frame memory and the data stored in the graphics frame memory to be output to the image display device.

14. An image output control method for controlling output of image data from the image output device of claim 13 to an image display device, comprising:

storing the display moving image data and the display graphics image data in the moving image line buffer and the graphics line buffer, respectively, in a period except for the blanking period of a horizontal synchronous signal among signals for use in image output to the image display device;

transferring the display moving image data and the display graphics image data from the moving image line buffer and the graphics line buffer to the moving image frame memory and the graphics frame memory, respectively, in the blanking period of the horizontal synchronous signal; and composing the display moving image data and the display graphics image data to be output to the image display device in a period except for the blanking period of the horizontal synchronous signal.

15. The image output device of claim 12 wherein the output data storage unit comprises a moving image frame memory for temporarily containing one frame of the display moving image data and successively outputting the stored display moving image data in units of one line, a moving image line buffer for temporarily containing output data from the moving image frame memory, a graphics frame memory for temporarily containing one frame of the display graphics image data and successively outputting the stored display graphics image data in units of one line, and a graphics line buffer for temporarily containing output data from the graphics frame memory, and composes the data stored in the moving image line buffer and the data stored in the graphics line buffer or separately output the data to the image display device.

16. An image output control method for controlling output of image data from the image output device of claim 15 to an image display device, comprising:

storing the display moving image data and the display graphics image data in the moving image frame memory and the graphics frame memory, respectively, in a period except for a blanking period of a horizontal synchronous signal among signals for use in image output to the image display device;

transferring the display moving image data and the display graphics image data from the moving image frame memory and the graphics frame memory to the moving image line buffer and the graphics line buffer, respectively, in the blanking period of the horizontal synchronous signal; and composing the display moving image data and the display graphics image data or separately outputting the same to the image display device in a period except for the blanking period of the horizontal synchronous signal.

17. The image output device of claim 12 wherein the output data storage unit comprises a moving image frame memory for temporarily containing one frame of the display moving image data and successively outputting the stored display moving image data in units of one line, a graphics frame memory for temporarily containing one frame of the display graphics image data and successively outputting the stored display graphics image data in units of one line, and a line buffer for composing output data from the moving image frame memory and output data from the graphics frame memory and temporarily containing the composed data.

18. An image output control method for controlling output of image data from the image output device of claim 17 to an image display device, comprising:

storing the display moving image data and the display graphics image data in the moving image frame memory and the graphics frame memory, respectively, in a period except for a blanking period of a horizontal synchronous signal among signals for use in image output to the image display device;

composing output data from the moving image frame memory and output data from the graphics frame memory to be transferred to the line buffer in the blanking period of the horizontal synchronous signal; and outputting the data stored in the line buffer to the image display device in a period except for the blanking period of the horizontal synchronous signal.

19. The image output device of claim 12 wherein the output data storage unit comprises a moving image line buffer for temporarily containing one line of the display moving image data, a moving image frame memory for temporarily containing one frame of output data from the moving image line buffer and outputting the stored display moving image data in units of one line, a graphics line buffer for temporarily containing one line of the display graphics image data, a graphics frame memory for temporarily containing one frame of output data from the graphics line buffer and outputting the stored display graphics image data in units of one line, and a line buffer for composing output data from the moving image frame memory and output data from the graphics frame memory, temporarily containing the composed data as display image data, and outputting the display image data to the image display device.

20. An image output control method for controlling output of image data from the image output device of claim 19 to an image display device, comprising:

transferring data stored in the moving image line buffer and data stored in the graphics line buffer to the moving image frame memory and the graphics frame memory, respectively, in a half of a blanking period of a horizontal synchronous signal among signals for use in image output to the image display device; and composing output data from the moving image frame memory and output data from the graphics frame memory to be transferred to the line buffer in the other half of the blanking period of the horizontal synchronous signal.

21. The image output device of claim 12 wherein the output data storage unit comprises a first moving image line buffer for temporarily containing one line of the display moving image data, a moving image frame memory for temporarily containing one frame of output data from the first moving image line buffer and successively outputting the stored display moving image data in units of one line, a second moving image line buffer for temporarily containing output data from the moving image frame memory, a first graphics line buffer for temporarily containing one line of the display graphics image data, a graphics frame memory for temporarily containing one frame of output data from the first graphics line buffer and successively outputting the stored display graphics image data in units of one line, and a second graphics line buffer for temporarily containing output data from the graphics frame memory, and composes the data stored in the second moving image line buffer and the data stored in the second graphics line buffer to be output to the image display device.

22. An image output control method for controlling output of image data from the image output device of claim 21 to an image display device, comprising:

transferring the data stored in the first moving image line buffer and the data stored in the first graphics line buffer to the moving image frame memory and the graphics frame memory, respectively, in a half of a blanking period of a horizontal synchronous signal among signals for use in image output to the image display device; and transferring the data stored in the moving image frame memory and the data stored in the graphics frame memory to the second moving image line buffer and the second graphics line buffer, respectively, in the other half of the blanking period of the horizontal synchronous signal.

23. The image output device of claim 1 comprising an operation clock stop control unit for controlling operation clocks in the device to be stopped when the data transfer or the data processing is not carried out.

24. An image output device comprising a data memory for containing image data, a video processing unit for carrying out an image processing for the image data to generate display image data, a data transfer control unit for controlling data transfer between the data memory and the video processing unit, an output data storage unit for temporarily containing the display image data and outputting the display image data to an image display device at regular intervals, and a system control unit for controlling the entire device, said image output device comprising a fixed cycle interruption generation unit for outputting an interrupt signal to the system control unit at regular intervals in accordance with signals for use in image output to the image display device, wherein said system control unit judges whether the data transfer is to be carried out in accordance with input of the interrupt signal, and in a case where the control unit judged that it is an interrupt timing when the transfer is to be carried out, issues a data transfer request for carrying out the data transfer to the data transfer control unit, and in a case where the control unit judged that it is not an interrupt timing when the transfer is to be carried out, does not issue the data transfer request.

25. The image output device of claim 24 wherein the system control unit issues a moving image transfer request for transferring moving image data which are stored in the data memory, and a graphics transfer request for transferring graphics data which are stored in the data memory, respectively.

* * * * *